United States Patent
Matsushima

(10) Patent No.: US 8,218,165 B2
(45) Date of Patent: Jul. 10, 2012

(54) INTERRUPTION MANAGEMENT METHOD FOR AN IMAGE FORMING APPARATUS

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1129 days.

(21) Appl. No.: 12/051,226

(22) Filed: Mar. 19, 2008

(65) Prior Publication Data

US 2008/0239357 A1    Oct. 2, 2008

(30) Foreign Application Priority Data

Mar. 26, 2007 (JP) ................. 2007-079242
Jan. 11, 2008 (JP) ................. 2008-004866

(51) Int. Cl.
*G06F 15/00* (2006.01)
*G06K 1/00* (2006.01)
*G06K 15/00* (2006.01)
*G06F 3/12* (2006.01)

(52) U.S. Cl. ................... 358/1.14; 358/1.13
(58) Field of Classification Search .............. None
See application file for complete search history.

(56) References Cited

U.S. PATENT DOCUMENTS

| | | | |
|---|---|---|---|
| 7,019,860 B2 | 3/2006 | Matsushima | |
| 7,042,593 B2 | 5/2006 | Matsushima | |
| 7,117,493 B2 | 10/2006 | Matsushima | |
| 7,773,241 B2 * | 8/2010 | Akao | 358/1.14 |
| 2001/0016824 A1 | 8/2001 | Matsushima | |
| 2004/0109187 A1 | 6/2004 | Matsushima | |
| 2004/0148328 A1 | 7/2004 | Matsushima | |
| 2004/0267808 A1 | 12/2004 | Matsushima | |
| 2005/0097314 A1 | 5/2005 | Matsushima | |
| 2006/0064459 A1 | 3/2006 | Matsushima | |
| 2006/0085498 A1 | 4/2006 | Matsushima | |
| 2006/0092468 A1 | 5/2006 | Matsushima | |
| 2006/0103879 A1 | 5/2006 | Matsushima | |
| 2006/0230152 A1 | 10/2006 | Matsushima | |
| 2007/0043806 A1 | 2/2007 | Matsushima | |
| 2007/0109586 A1 * | 5/2007 | Yamada et al. | 358/1.14 |
| 2007/0258098 A1 | 11/2007 | Matsushima | |

FOREIGN PATENT DOCUMENTS

JP    3340299    8/2002

* cited by examiner

*Primary Examiner* — Douglas Tran
(74) *Attorney, Agent, or Firm* — Oblon, Spivak, McClelland, Maier & Neustadt, L.L.P.

(57) ABSTRACT

A user-interface unit receives a request from a user. A control unit performs an execution control in response to the request received by the user-interface unit, and during an execution process, performs an interruption process and an authentication process. An application-logic unit provides a plurality of functions related to an image forming process. A device-service unit provides a shared service for the application-logic unit.

20 Claims, 26 Drawing Sheets

FIG. 5A

LOGIN
ENTER USERNAME AND PASSWORD

USERNAME [        ]     [ INPUT ]

PASSWORD [        ]     [ INPUT ]

NONCONTACT-TYPE IC CARD

LOGIN
HOLD IC CARD OVER SENSOR

FIG. 5C

CONTACT-TYPE IC CARD

LOGIN
INSERT IC CARD

FIG. 5D

LOGIN
ENTER PASSWORD

PASSWORD [          ]     [ INPUT ]

AUTHENTICATION FAILED

RETRY

FIG. 7C

SCREEN LOCKED
HOLD IC CARD OVER SENSOR

FIG. 8A

INTERRUPTION
FOR DIFFERENT USER, REMOVE IC CARD AND INSERT YOUR IC CARD

| INTERRUPTION BY IDENTICAL USER | CANCEL |

FIG. 8B

INTERRUPTION
INSERT IC CARD

CANCEL

FIG. 8C

SCREEN LOCKED
INSERT IC CARD

FIG. 8D

REMOVE IC CARD

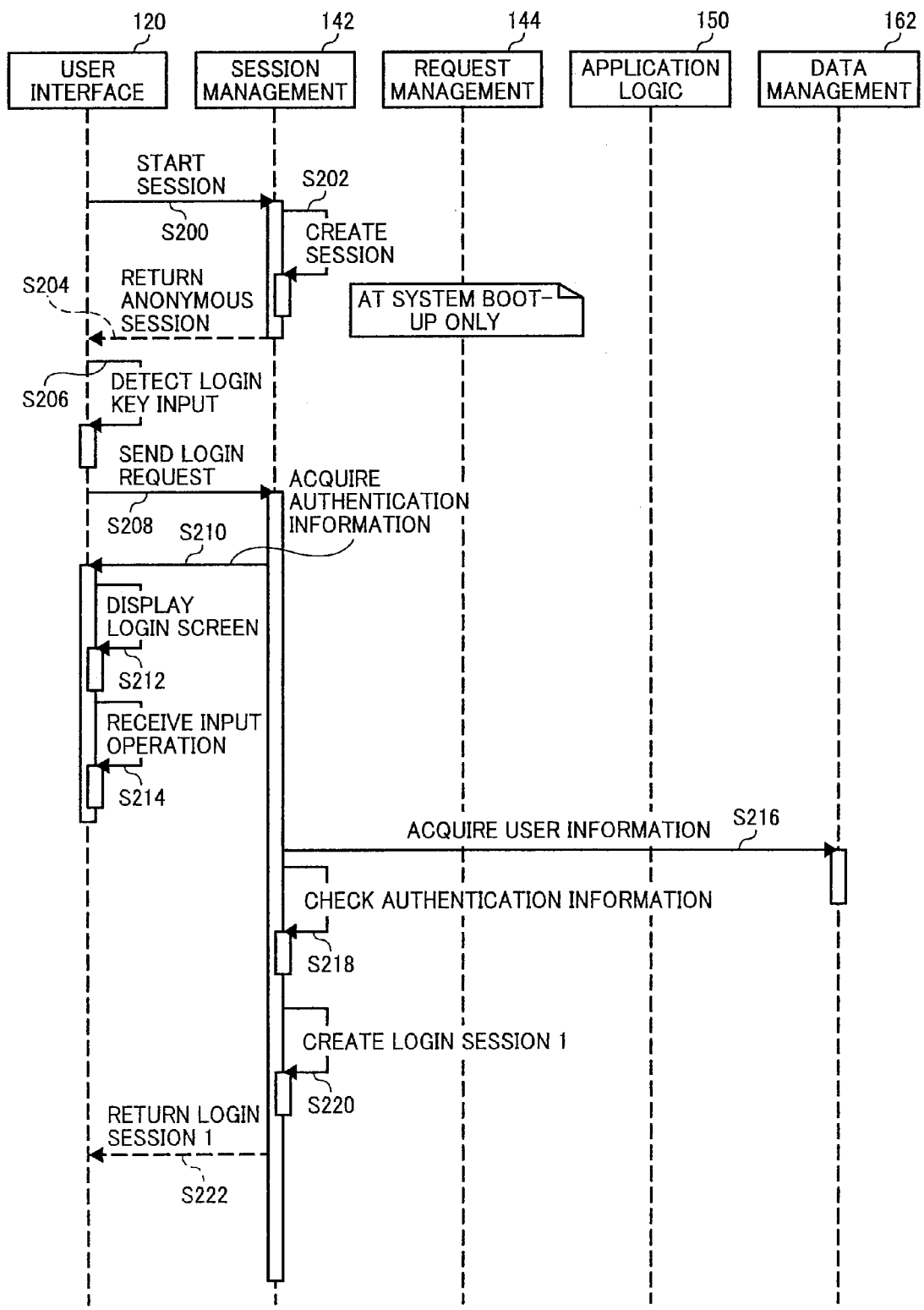

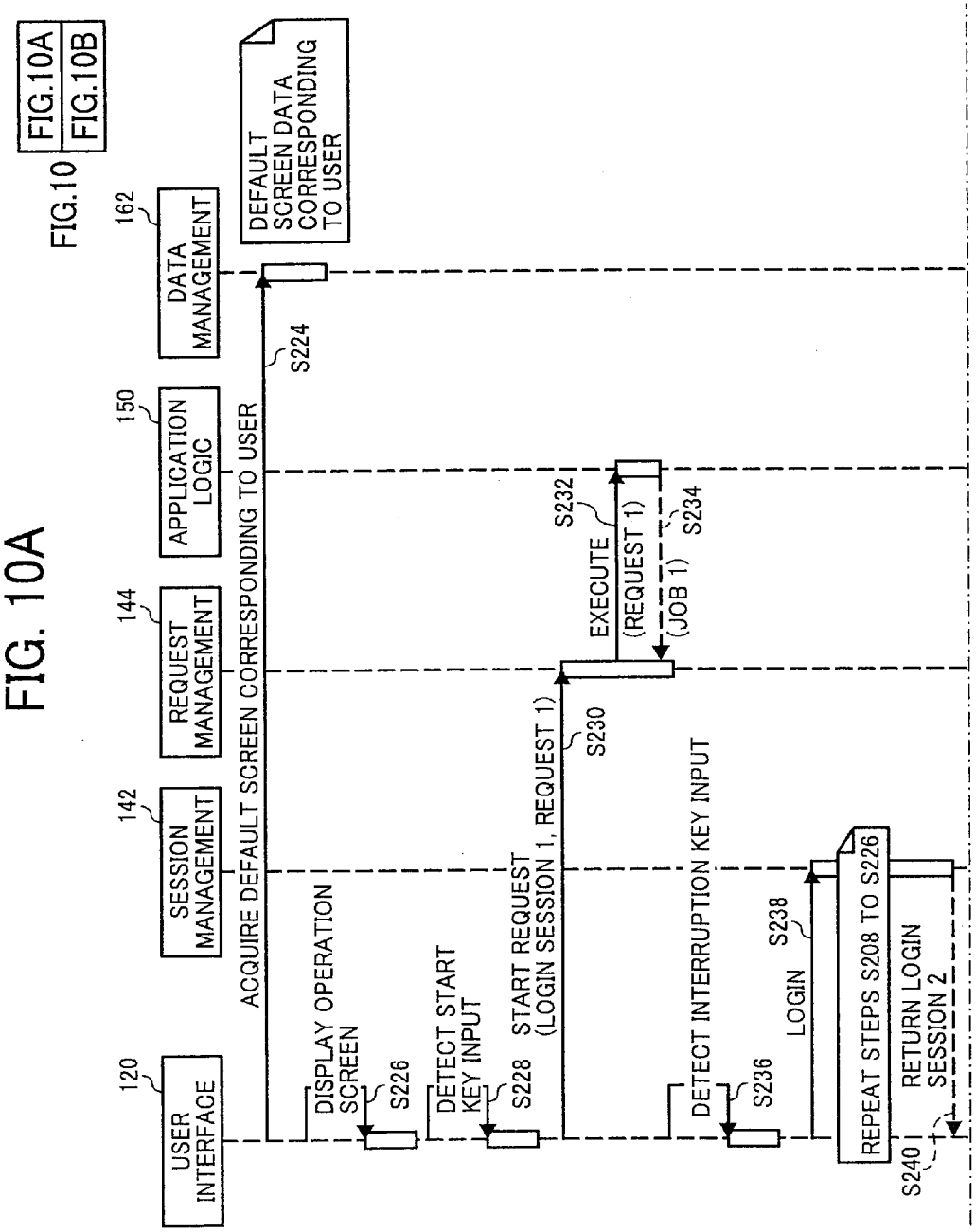

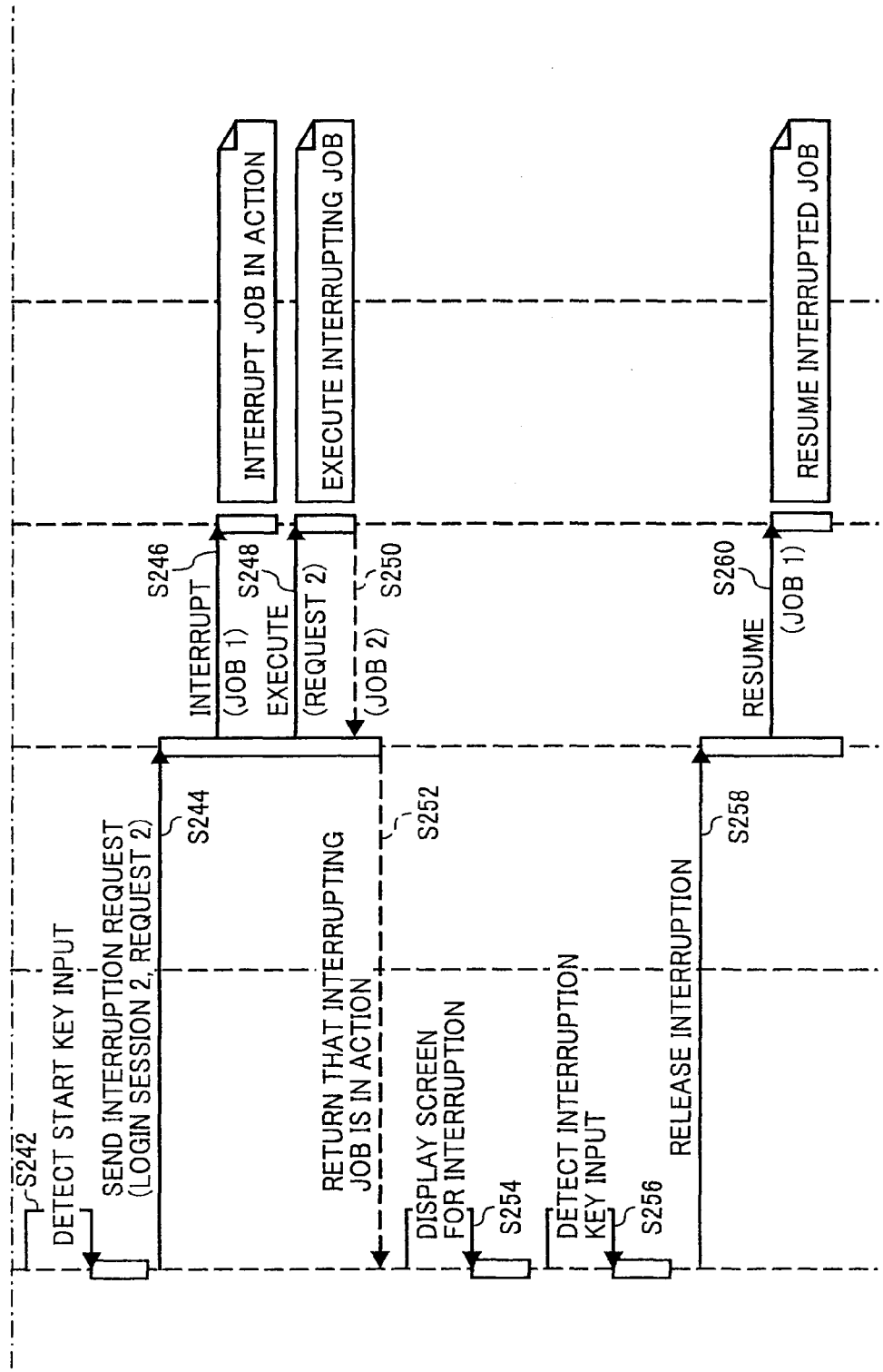

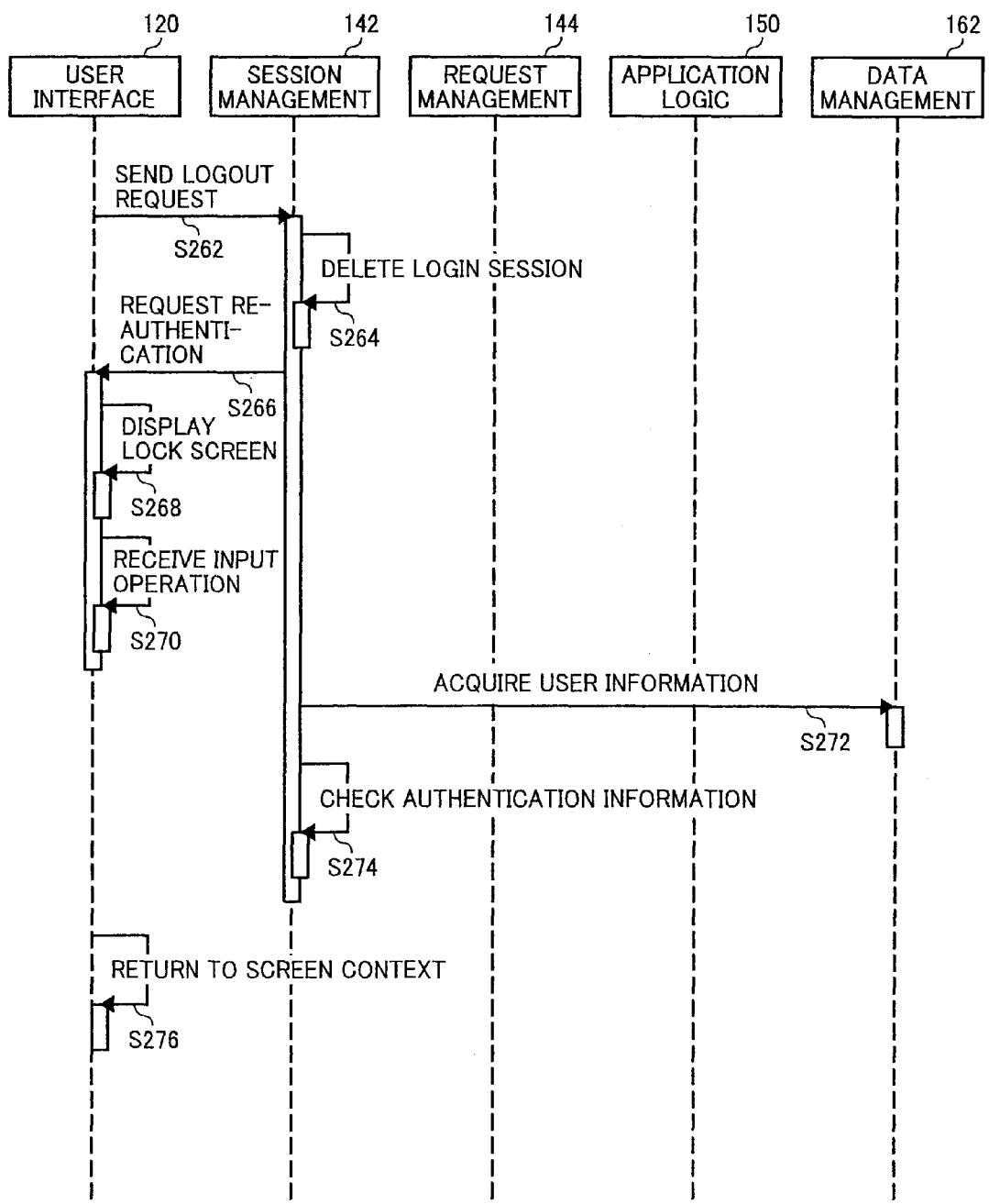

INTERRUPTION MANAGEMENT METHOD FOR AN IMAGE FORMING APPARATUS

CROSS-REFERENCE TO RELATED APPLICATIONS

The present application claims priority to and incorporates by reference the entire contents of Japanese priority documents, 2007-079242 filed in Japan on Mar. 26, 2007 and 2008-004866 filed in Japan on Jan. 11, 2008.

BACKGROUND OF THE INVENTION

1. Field of the Invention

The present invention relates to an image forming apparatus, an interruption management method, and computer program product.

2. Description of the Related Art

There has been known image forming apparatus that have various functions such as a printer, a copier, a facsimile machine, and a scanner (hereinafter, "multifunction product").

Some of multifunction products, specifically designed to be shared by a plurality of users, have an interruption function that allows interrupting a current job in action and then executing an interruption job that is accepted later. This interruption function is helpful, for example, during a mass copy job. One of multifunction products having the interruption function is disclosed in, for example, Japanese Patent Application No. 3340299. The interruption function makes the multifunction product to improve its usability and its operation efficiency.

However, the multifunction product disclosed in Japanese Patent No. 3340299 cannot exclude a non-authentic interruption process by a masquerade third party who pretends to be an authentic user. More particularly, while the authentic user of a current job in action is absent from the multifunction product, the masquerade third party pretending to be the authentic user can interrupt the current job and executes an interruption job. If the multifunction product charges based on jobs, a non-authentic interruption causes an inappropriate charge.

SUMMARY OF THE INVENTION

It is an object of the present invention to at least partially solve the problems in the conventional technology.

According to an aspect of the present invention, there is provided an image forming apparatus having a plurality of functions related to an image forming process. The image forming apparatus includes a user-interface unit that receives a request from a user; a control unit that performs an execution control in response to the request received by the user-interface unit, and during an execution process, performs an interruption process and an authentication process; an application-logic unit that provides the functions related to the image forming process; and a device-service unit that provides a shared service for the application-logic unit.

Furthermore, according to another aspect of the present invention, there is provided a method of managing an interruption in an image forming apparatus having a plurality of functions related to an image forming process. The method includes request managing including a user-interface unit receiving a request from a user; execution controlling including a control unit performing an execution control in response to the request received at the request managing, and during an execution process, performing an interruption process and an authentication process; function providing including an application-logic unit providing the functions related to the image forming process; and device providing including a device-service unit providing a shared service for the application-logic unit.

Moreover, according to still another aspect of the present invention, there is provided a computer program product comprising a computer-usable medium having computer-readable program codes embodied in the medium that when executed cause a computer to execute request managing including a user-interface unit receiving a request from a user; execution controlling including a control unit performing an execution control in response to the request received at the request managing, and during an execution process, performing an interruption process and an authentication process; function providing including an application-logic unit providing the functions related to the image forming process; and device providing including a device-service unit providing a shared service for the application-logic unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a schematic diagram of an authentication screen for login;

FIG. 5B is a schematic diagram of a login screen requiring a noncontact integrated-circuit (IC) card;

FIG. 5C is a schematic diagram of a login screen requiring a contact-type IC card;

FIG. 5D is a schematic diagram of an authentication screen for a registered user;

FIG. 5E is a schematic diagram of an authentication-failure screen;

FIG. 7C is a schematic diagram of a lock screen requiring the noncontact IC card;

FIG. 8A is a schematic diagram of an interruption screen requiring the contact-type IC card;

FIG. 8B is a schematic diagram of an insert requiring screen that appears when the contact-type IC card is removed;

FIG. 8C is a schematic diagram of a lock screen requiring the contact-type IC card;

FIG. 8D is a schematic diagram of an interruption-release screen requiring the contact-type IC card FIGS. 9 to 11 are sequence diagrams for explaining process performed by the MFP;

DETAILED DESCRIPTION OF THE PREFERRED EMBODIMENTS

Exemplary embodiments of the present invention are described in detail below with reference to the accompanying drawings.

Figure 1:
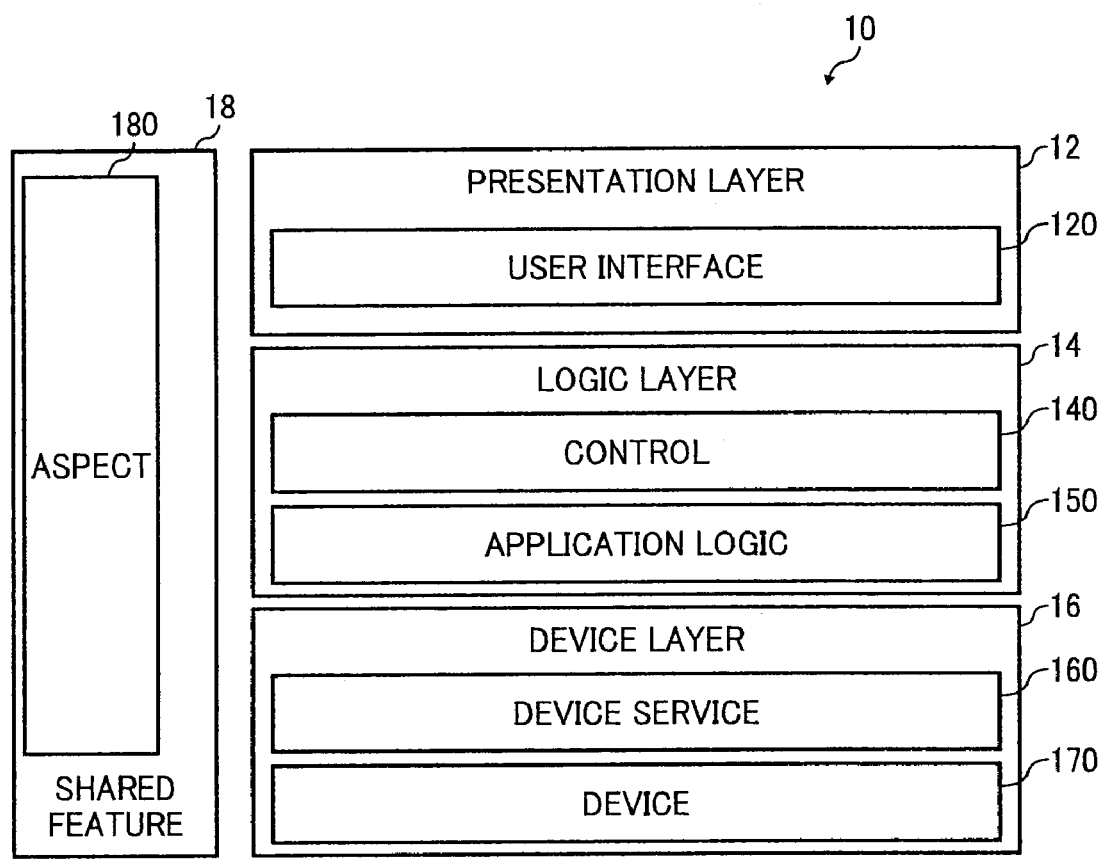
FIG. 1 is a block diagram for explaining the software configuration of a multifunction product (MFP) according to a first embodiment of the present invention.

FIG. 1 is a block diagram for explaining the software configuration of a multifunction product (MFP) 10. The software configuration of the MFP 10 is separated into three layers, i.e., a presentation layer 12, a logic layer 14, and a device layer 16, each of which includes at least one component. The software configuration of the MFP 10 provides a shared feature 18 that can be used by any layers, besides. When a process is changed in any one of the presentation layer 12, the logic layer 14, and the device layer 16, the other two layers are not subjected to the change.

The MFP 10 includes functions such as a user interface (UI) 120, a control 140, an application logic 150, a device service 160, a device 170, and an aspect 180.

The UI 120 is a component of the presentation layer 12. The control 140 and the application logic 150 are components of the logic layer 14. The device service 160 and the device 170 are components of the device layer 16. The aspect 180 belongs to the shared feature 18.

The UI 120 receives a request from a user or a subscriber of a predetermined web service, and transfers a right to execute the request to the control 140.

Upon receiving the right to execute the request from the UI 120, the control 140 activates a function required to implement the request. The activated function can be a single function such as reading or printing that is executed by a single device or can be a combination of single functions such as copying or sending of a scanned image. The application logic 150 is a group of functions provided by the MFP 10. The application logic 150 has functions such as receiving or sending, in addition to the scanning or the printing.

The device service 160 is a component having a sub-function that is commonly used by the application logic 150. The device 170 is a component for operating an operation system (OS) or hardware for a device control. The OS and the hardware are wrapped so that any change in the OS or the hardware cannot affect an upper layer.

The aspect 180 uses a logic that can affect the above-described sub-components. More particularly, the aspect 180 performs access control, recording logs, or charging. This makes it possible to avoid specification changes, which are caused from plug-in and customization of a sub-component, concentrating in the logic.

Figure 2:
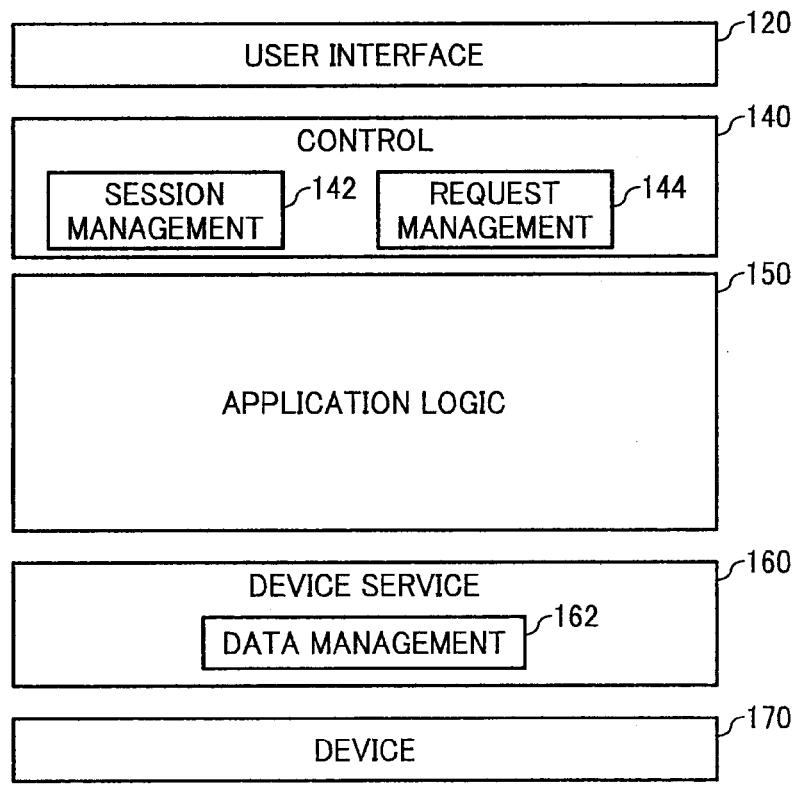
FIG. 2 is a block diagram for explaining processes performed by components of the MFP shown in FIG. 1.

FIG. 2 is a block diagram for explaining processes performed by the components. Given below is an explanation of a process during copy processing. Upon receiving a copy request from a user, a local UI (not shown) of the UI 120 sends the copy request to a session management 142 and a request management 144 of the control 140. Explained from the time order, the session management 142 determines whether the user is authentic. When the user is authentic, the UI 120, which works as the application, appears so that circumstances that allow receiving a request are prepared. When the user fixes a target job and presses a start key 34, the UI 120 sends the session information that is obtained from a result of the authentication and a request (job information) to the request management 144.

The session management 142 has a responsibility to associate a user with an activity (a series of processes executed by the system) during a period from login to logout of the user (hereinafter, "session"). The session management 142 performs a user authentication to identify a user who requests an operation. A salient feature of the first embodiment is to request, in response to a request of interruption, the user to enter authentication information or to display a lock screen at the end of the interruption. When the session management 142 determines that the user is authentic, the session management 142 creates a session and sends the created session to the request management 144. On the other hand, when the session management 142 determines that the user is not authentic, the session management 142 does not create a session. The session management 142 does not delete the authentication information until its expired time of the session. If a sequential interruption by the identical user happens, the session management 142 can skip a password check in a second or afterward user authentication. This allows the identical user to save entering the password again. Moreover, the session management 142 can skip the lock screen to be displayed at the end of the sequential interruption by the identical user. This allows the identical user to save entering the password again.

The request management 144 decides the order of executing a plurality of requests, and causes the requests to be executed in accordance with the order. The request management 144 manages a lifecycle of a request, and returns an abnormal request-termination to a normal process. The request management 144 does not execute the application until receiving a valid session from the session management 142. The application cannot be executed by any unit other than the request management 144. The valid session indicates a session associated with an ID of a user who has an authority to execute the application.

A data management 162 of the device service 160 manages user information or the like that is commonly used. For example, the session management 142 acquires target user information from the data management 162 to perform the user authentication.

Figure 3:
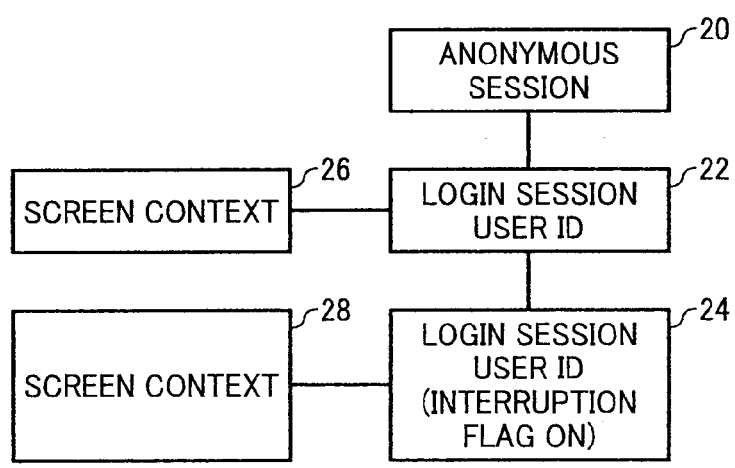
FIG. 3 is a block diagram for explaining the data formation of a session used in the MFP.

FIG. 3 is a block diagram for explaining the data formation of a session used in the MFP 10. The session includes an anonymous session 20, a login session 22, a login session (interruption flag ON) 24, a screen contexts 26 and 28.

The anonymous session 20 is created at a system startup. The login session 22 is created at a login. The login session (interruption flag ON) 24 is created at an interruption. The screen contexts 26 and 28 are used to re-build a screen that appears after a release of an interruption and a release of a lock screen.

The session information is sent from the session management 142 to the request management 144 to start a request or to request an interruption. Thus, it is possible to perform an access control or a charge control based on the session information (user ID) after the execution of the application.

Figure 4:
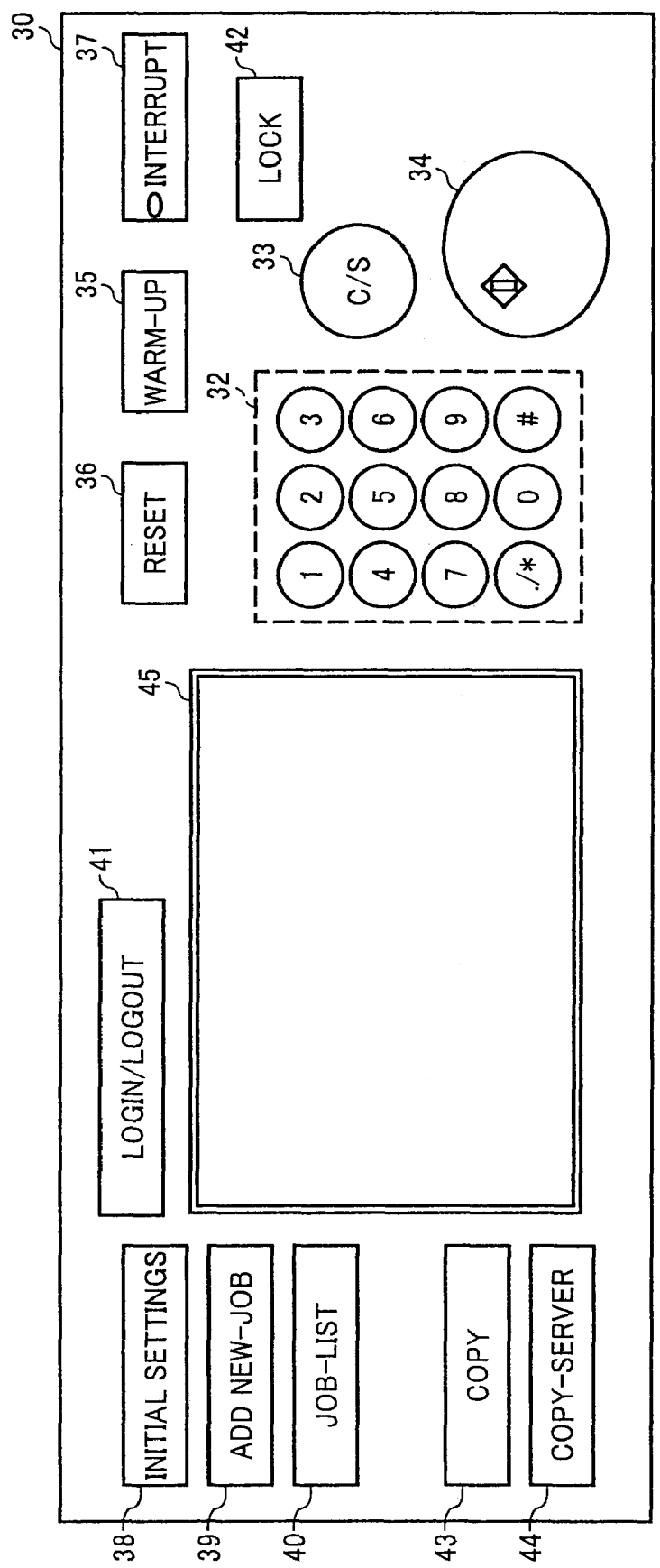
FIG. 4 is a schematic diagram of an operation unit of the MFP.

FIG. 4 is a schematic diagram of an operation unit 30 of the MFP 10. The operation unit 30 includes a liquid-crystal-display (LCD) touch panel 45, a numeric keypad 32, a clear/stop key 33, the start key 34, a warm-up key 35, a reset key 36, an interruption key 37, an initial settings key 38, an add new-job key 39, a job list key 40, a copy key 43, and a copy server key 44.

Various operation screens are displayed on the LCD touch panel 45 depending on functions. The user presses a button on the LCD touch panel 45 or manipulates the numeric keypad 32 thereby executing a target function of the MFP 10.

Given below is an explanation of a process performed by the MFP 10 with reference to exemplary operation screens shown in FIGS. 5 to 8 and sequence diagrams shown in FIGS. 9 to 11.

Figure 5E:
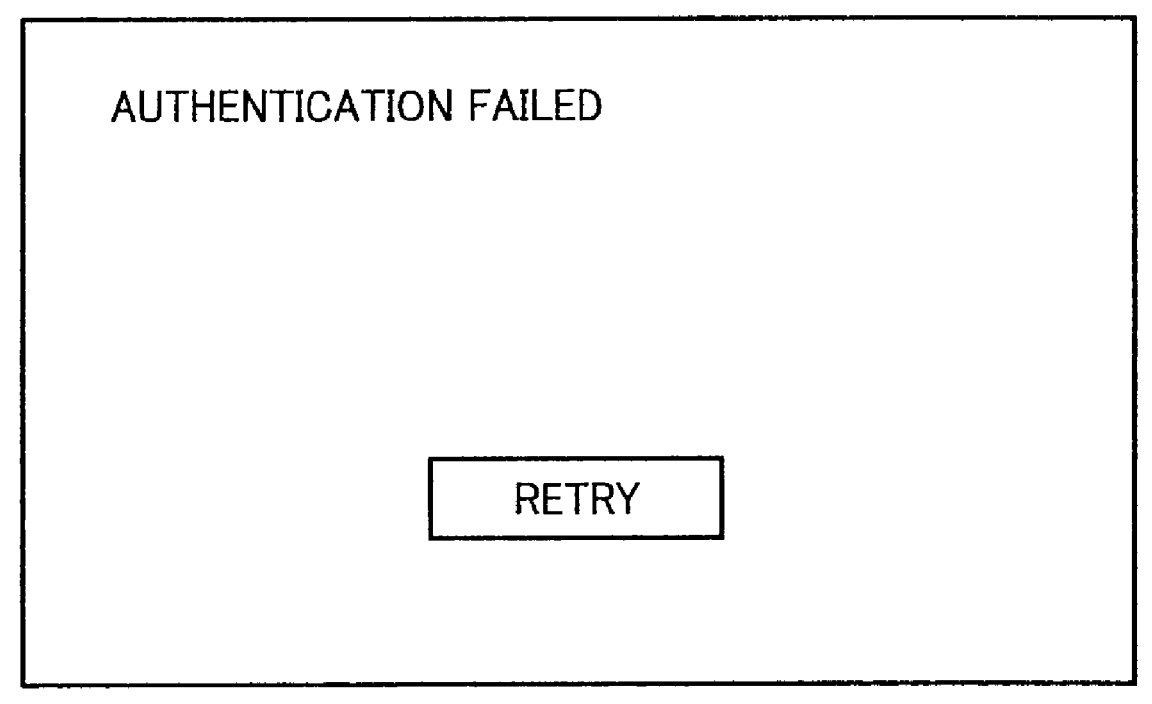
Figure 5F:
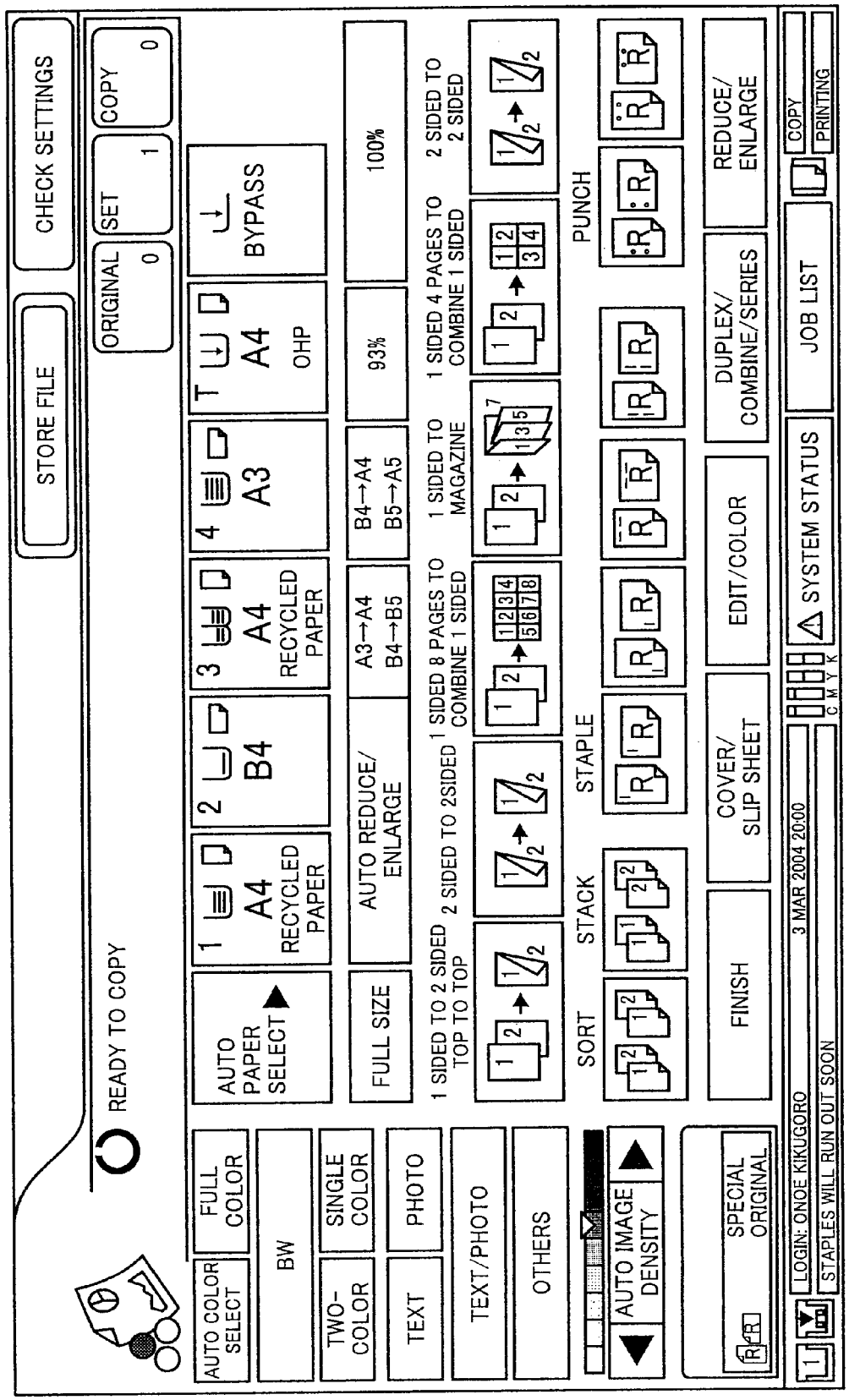
FIG. 5F is a schematic diagram of an authentication-success screen.

FIG. 5A is a schematic diagram of an authentication screen for login; FIG. 5B is a schematic diagram of a login screen requiring a noncontact IC card; FIG. 5C is a schematic diagram of a login screen requiring a contact-type IC card; FIG. 5D is a schematic diagram of an authentication screen for a registered user; FIG. 5E is a schematic diagram of an authentication-failure screen; and FIG. 5F is a schematic diagram of an authentication-success screen.

Figure 6A:
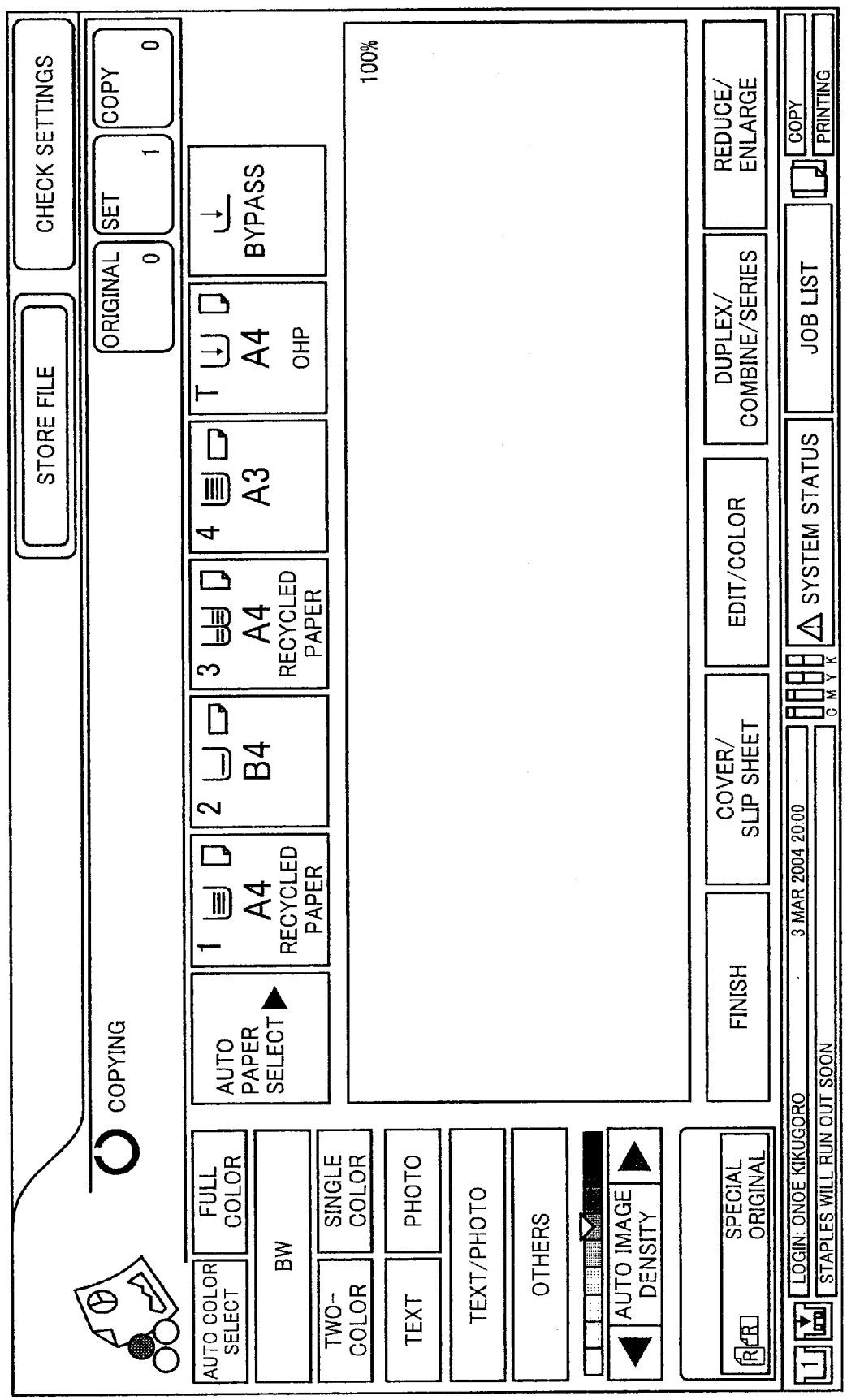
FIG. 6A is a schematic diagram of an operation screen during copying.
Figure 6B:
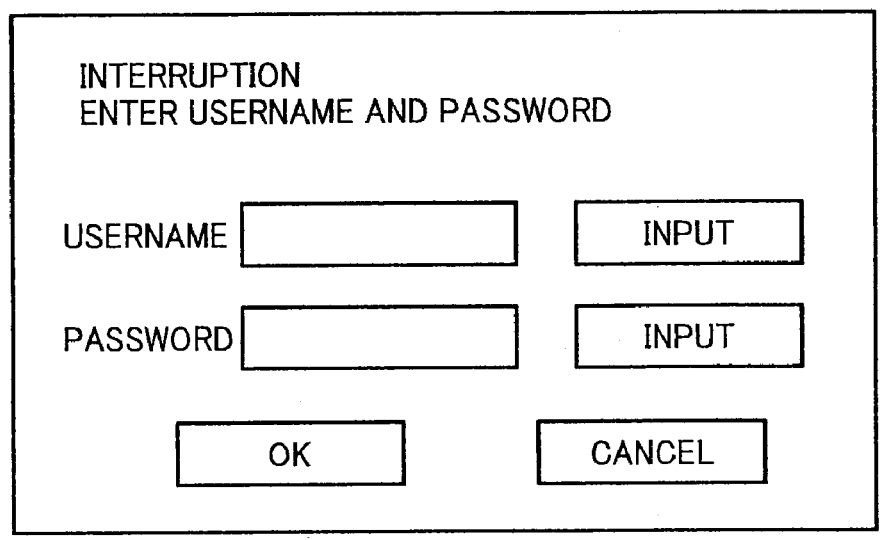
FIG. 6B is a schematic diagram of an authentication screen in response to an interruption request.
Figure 6C:
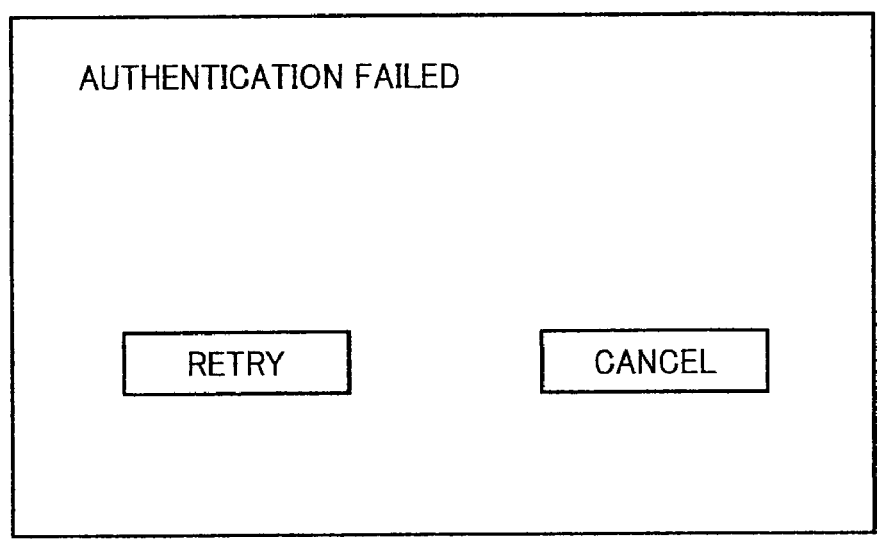
FIG. 6C is a schematic diagram of another authentication-failure screen.
Figure 6D:
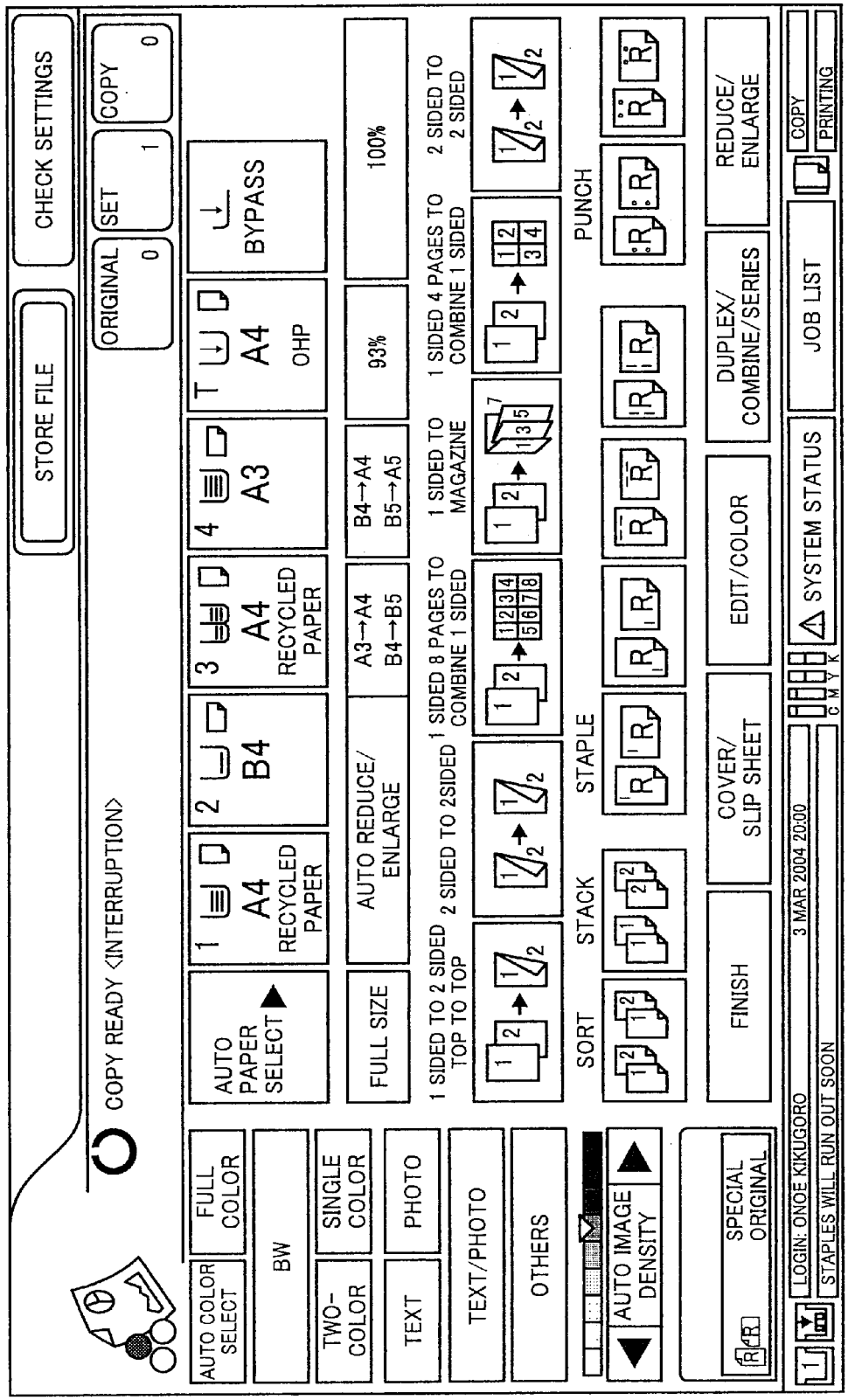
FIG. 6D is a schematic diagram of an interruption-operation screen that appears when the authentication succeeds.
Figure 6E:
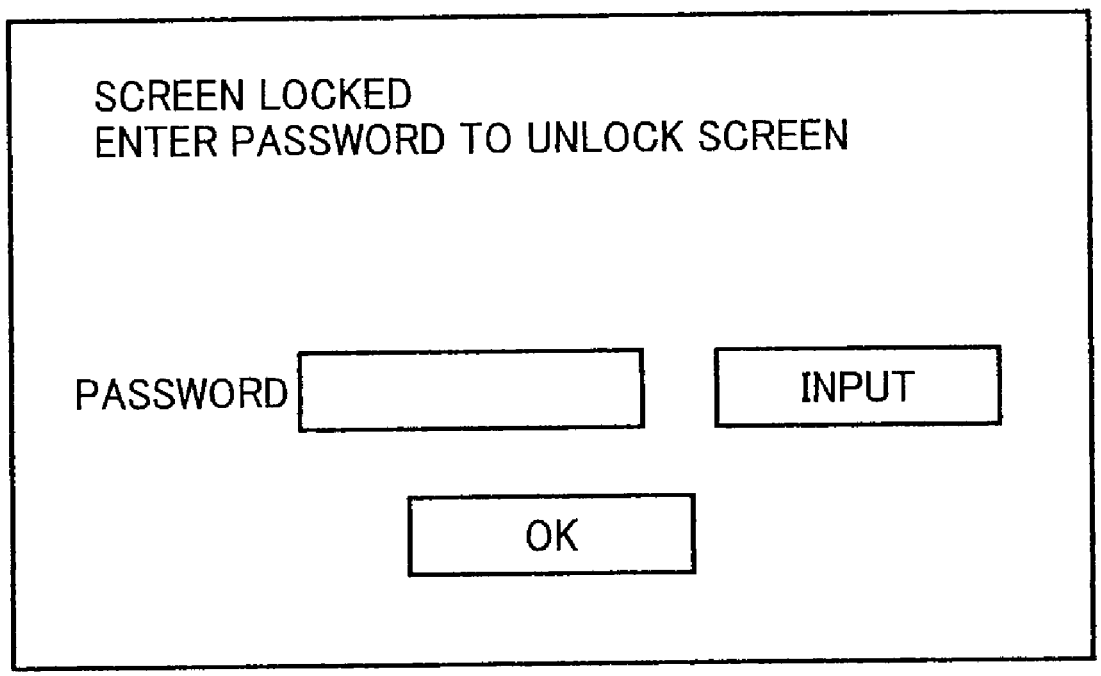
FIG. 6E is a schematic diagram of a lock screen.

FIG. 6A is a schematic diagram of an operation screen during copying; FIG. 6B is a schematic diagram of an authentication screen in response to an interruption request; FIG. 6C is a schematic diagram of an authentication-failure screen; FIG. 6D is a schematic diagram of an interruption-operation screen that appears when the authentication succeeds; and FIG. 6E is a schematic diagram of a lock screen.

Figure 7A:
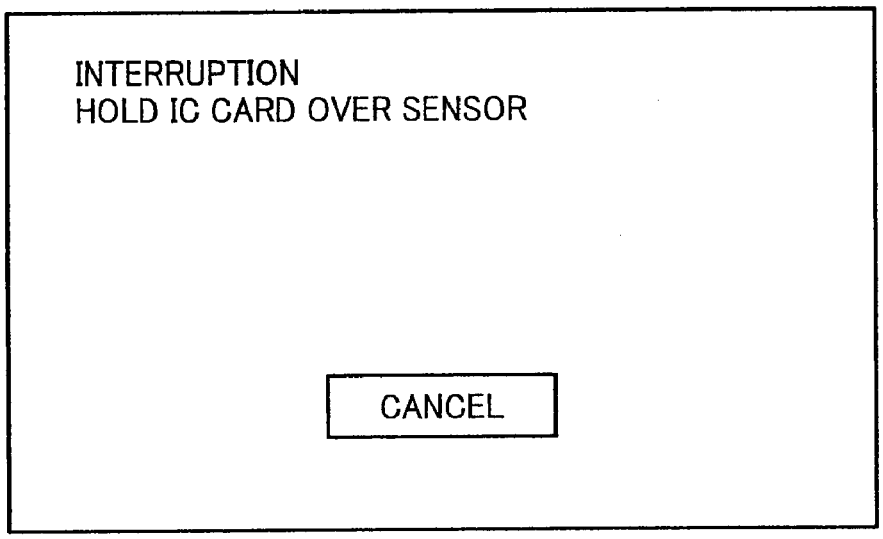
FIG. 7A is a schematic diagram of an interruption screen requiring the noncontact IC card.
Figure 7B:
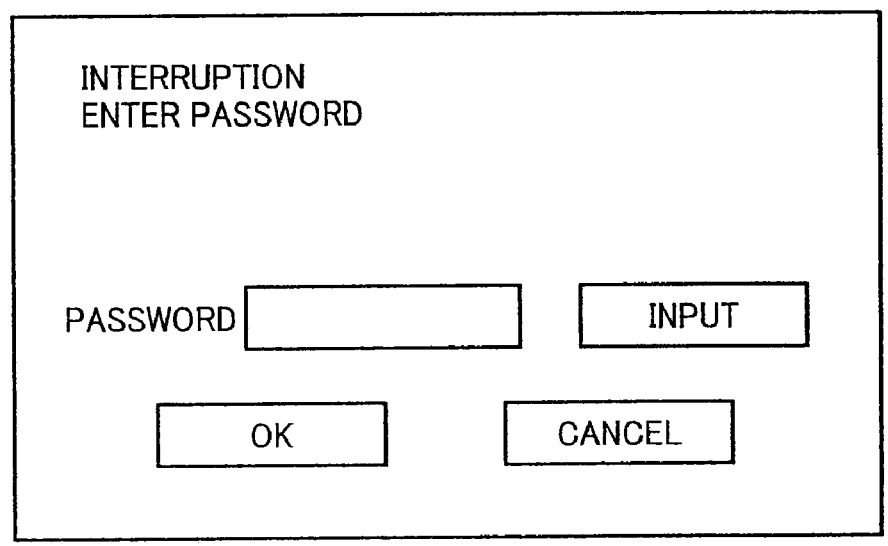
FIG. 7B is a schematic diagram of an authentication screen requiring the contact-type IC card.
Figure 7C:
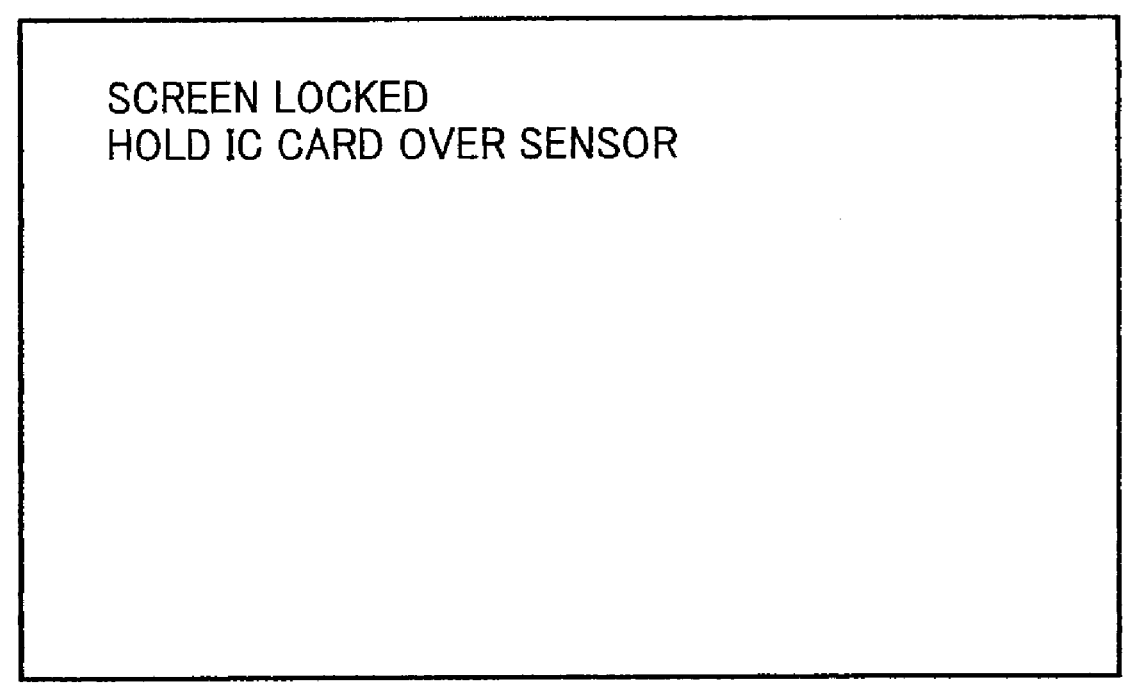

FIG. 7A is a schematic diagram of an interruption screen requiring a noncontact IC card; FIG. 7B is a schematic diagram of an authentication screen requiring the contact-type IC card; and FIG. 7C is a schematic diagram of a lock screen requiring the noncontact IC card.

FIG. 8A is a schematic diagram of an interruption screen requiring the contact-type IC card; FIG. 8B is a schematic diagram of an insert requiring screen that appears when the contact-type IC card is removed; FIG. 8C is a schematic diagram of a lock screen requiring the contact-type IC card; and FIG. 8D is a schematic diagram of an interruption-release screen requiring the contact-type IC card.

Figure 12:
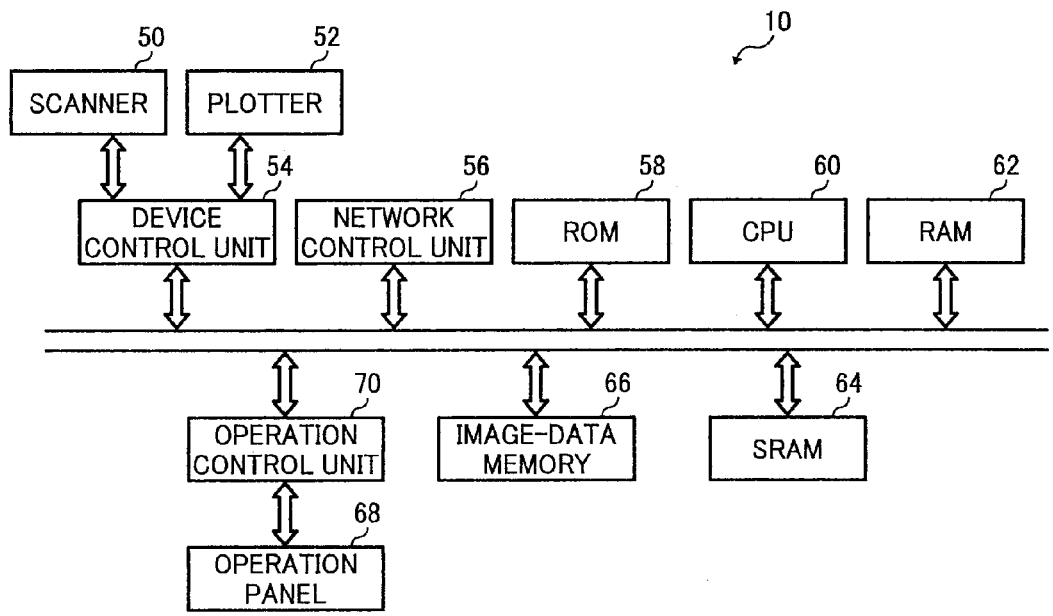
FIG. 12 is a block diagram for explaining the hardware configuration of the MFP.

FIGS. 9 to 11 are sequence diagrams for explaining the process performed by the MFP 10. FIG. 12 is a block diagram for explaining the hardware configuration of the MFP 10.

When the UI 120 notifies at a system startup the session management 142 that a session starts (Step S200), the session management 142 creates the anonymous session 20 (Step S202) and returns the anonymous session 20 to the UI 120 (Step S204).

After detecting a login/logout key 41 shown in FIG. 4 is presses (Step S206), the UI 120 sends a login request to the session management 142 (Step S208). The session management 142 requests the UI 120 to send the authentication information (Step S210). The UI 120 displays the login screen (Step S212), and receives an input operation from the user (Step S214).

The login screen shown in FIG. 5A can receives authentication information such as a username and a password. When the user enters authentication information and presses an OK button, the UI 120 receives the authentication information. The session management 142 acquires target user information from the data management 162 (Step S216), and determines whether the user is authentic by comparing the authentication information with the target user information (Step S218). The session management 142 creates a login session (Step S220) and returns the created login session to the UI 120 (Step S222).

When the session management 142 determines that the user is authentic, the UI 120 acquires a default screen data corresponding to the user from the data management 162 (Step S224). As a result, a copy operation screen shown in FIG. 5F appears (Step S226).

When the session management 142 determines that the user is not authentic, the authentication-failure screen shown in FIG. 5E appears. Although the authentication-failure screen says "authentication failed" simply, it is possible to add a cause of failure, i.e., which one is incorrect between the username and the password. When the retry button is presses or when a predetermined time has been passed without a press of the retry button, the login screen shown in FIG. 5A appears again. If only the password is incorrect, it is possible to display the login screen shown in FIG. 5D to enter only the password.

Instead of typing the username, it is allowable to use an IC card for entering a user ID that is equivalent to a username by holding a noncontact IC card over the sensor (see, FIG. 5B) or by inserting a contact-type IC card (see, FIG. 5C). After the user is determined to be a registered user through the noncontact IC card or the contact-type IC card, the login screen, as shown in FIG. 5D, for requesting only a password is displayed to perform the authentication.

After that, the user sets a desired mode using the authentication-success screen shown in FIG. 5F and presses the start key 34. Upon detecting the start key 34 presses (Step S228), the UI 120 sends the login session 1 and a request 1 to the request management 144 (Step S230). The request management 144 executes the application (Step S232), and then the application logic 150 returns a job 1 to the request management 144 (Step S234). The operation screen shown in FIG. 6A appears during copying.

When another user presses the interruption key 37 during the copying, a light emission diode (LED) of a hard key turns ON and the UI 120 detects the interruption key 37 presses (Step S236) and requests the session management 142 to start login (Step S238). The salient feature of the first embodiment is to request the user authentication, i.e., processes from Steps S208 to S226 in response to the interruption. When the interruption authentication screen shown in FIG. 6B is displayed, the interrupting user who requests the interruption enters his/her username and password.

When the session management 142 determines that the interrupting user is not authentic, the authentication-failure screen shown in FIG. 6C is displayed. The interrupting user has to select either cancelling the interruption or retrying the authentication information. Although the authentication-failure screen says "authentication failed" simply, it is possible to add a cause of failure, i.e., which one is incorrect between the username and the password. When the interrupting user selects cancelling or when a predetermined time has been passed without a press of the retry button, the copy operation screen shown in FIG. 6A appears again. If the interrupting user selects retrying, the authentication screen shown in FIG. 6B appears again.

When the session management 142 determines that the interrupting user is authentic, the session management 142 returns a login session 2 to the UI 120 (Step S240). Upon detecting the start key 34 presses (Step S242), the UI 120 sends the login session 2 and a request 2 to the request management 144 and requests the request management 144 to perform the interruption (Step S244). Thereby, the request management 144 causes the application logic 150 to interrupt the job 1 that is in action (Step S246) and execute the request 2 as an interrupting job (job 2) (Step S248). After starting the job 2, the application logic 150 returns the job 2 to the request management 144 (Step S250). Upon receiving the job 2, the request management 144 returns to the UI 120 that the interrupting job is in action (Step S252). While the interrupting job is in action, the operation screen shown in FIG. 6D is displayed (Step S254).

After the interrupting job has been finished, the interrupting user presses the interruption key 37 again so that the LED turns OFF. Upon detecting the interruption key 37 re-presses (Step S256), the UI 120 causes the request management 144 to release the interruption (Step S258). In response to the release, the request management 144 causes the application logic 150 to resume the interrupted job 1 (Step S260). The salient feature of the first embodiment is to display the lock screen shown in FIG. 6E at the end of the interruption. This makes it possible to prevent an un-authorized third party from pretending to be the authentic user of the job interrupted due to the interruption.

There are two methods of setting a display/hide mode of the lock screen to be displayed at the end of interruptions. In the first method, the display/hide mode of the lock screen is selected depending on the operational circumstances and is set as initial settings or settings decided by an administrator. In the second method, the display/hide mode of the lock screen can vary depending on each interrupting job using a lock key 42 shown in FIG. 4. More particularly, if an interrupting user or an interrupted user presses the lock key 42 at the start or at the end of an interruption, even when the hide mode is selected as the initial settings or the settings decided by the administrator, the lock screen appears after the interrupting job has been finished. The lock key 42 can be either a hard key or a soft key to be displayed on the operation panel.

It is allowable to appear the lock screen shown in FIG. 6E when a predetermined time has pasted since the last operation while the operation screen shown in FIG. 6A appears or when the lock key 42 is pressed, in addition to when a re-press of the interruption key 37 indicative of the end of the interruption is detected. When the password that is received through the lock screen shown in FIG. 6E is authentic, the operation screen shown in FIG. 6A appears again thereby making it possible to execute the interrupted copy operation. If the interruption key 37 is pressed without receiving a password through the lock screen shown in FIG. 6E, it is possible to display the authentication screen shown in FIG. 6B to perform user authentication to accept another interruption.

Assuming that an authentication using a noncontact IC card and a password is performed in response to a request of an interruption, the authentication screen shown in FIG. 7A appears to prompt the user to hold the IC card over the sensor thereby receiving the user ID. When the user is a registered user, i.e., the system identifies the user, the authentication screen shown in FIG. 7B appears to prompt the user to enter the password. When the user who is identified through the noncontact IC card is identical to the user of the interrupted job, it is possible to display the authentication-success screen shown in FIG. 6D by skipping the authentication screen shown in FIG. 7B. This allows the user to save entering the password.

After the end of the interruption, the lock screen shown in FIG. 7C appears. If the system determines that a next user is not identical to the user of the interrupted job, the screen shown in FIG. 7B appears to prompt the next user to enter the password for authentication. When the interruption key 37 is pressed while the screen shown in FIG. 7C appears, the screen shown in FIG. 7A requiring an authentication using the noncontact IC card appears. If the system then determines from the IC card held over the screen shown in FIG. 7C that the next user is identical to the user of the interrupted job, the copy operation screen shown in FIG. 6A appears. Although the noncontact IC card is used at the lock release step with the lock screen shown in FIG. 7C, it is allowable to configure to use the password to release the lock.

Assuming that an authentication using a contact-type IC card and a password is performed in response to a request of an interruption, only when the interrupting user is a non-identical user, the authentication screen shown in FIG. 8A appears to prompt the interrupting user to remove the inserted IC card and insert his/her IC card. When the system detects that the inserted IC card is removed, the screen shown in FIG. 8B appears to prompt the interrupting user to insert his/her IC card. After that, when the system detects that the contact-type IC card is inserted and identifies the interrupting user as a registered user from the ID of the newly-inserted IC card, the screen shown in FIG. 7B appears to prompt the interrupting user to enter his/her password. On the other hand, when the interrupting user does not remove the inserted IC card but presses a button on the screen shown in FIG. 8A indicative of an interruption by the identical user, the system skips the screen shown in FIG. 7B and displays the interruption screen shown in FIG. 6B, i.e., the system does not request the user to enter the password.

When the system detects that the contact-type IC card is removed during the operation, the lock screen shown in FIG. 8C appears. If the system detects again that an IC card is inserted and determines that the newly-inserted IC card belongs to a user who is not identical to the user before the lock starts, the screen shown in FIG. 7B appears to prompt the user of the newly-inserted IC card to enter the password for authentication. If the interruption key 37 is pressed while the screen shown in FIG. 8C appears, the screen shown in FIG. 8B appears to prompt the user to insert his/her contact-type IC card for authentication. When the system determined that the user who inserts his/her IC card while the screen shown in FIG. 8C appears is identical to the user before the lock starts, the copy operation screen shown in FIG. 6A appears. After a series of events including the authentication success, the end of the interruption operation with a screen shown in FIG. 6D, and the interruption release, the screen shown in FIG. 8D appears to prompt the user to remove the contact-type IC card. Upon detecting the contact-type IC card is removed, the system displays the lock screen shown in FIG. 8C. The lock screen that appears at the end of the interruption or when the IC card is removed makes it possible to pretend a third party from pretending to be the authentic user.

FIG. 11 is a continuation of the sequence diagram shown in FIG. 10, i.e., a sequence diagram after Step S258. When the interruption is released, the logout process to logout the user who has logged in as the interrupting user is performed (Steps S262 and S264), and then the UI 120 displays the lock screen (Steps S266 and S268). If a new user enters a password and it is determined that the password is correct (Steps S270 to S274), the UI 120 displays the copy screen that is used to be displayed before the interruption starts (Step S276). More particularly, the UI 120 sends a logout request to the session management 142 (Step S262). Upon receiving the logout request, the session management 142 deletes the login session (Step S264). The session management 142 requests the UI 120 to perform a re-authentication (Step S266). The UI 120 displays the lock screen (Step S268) and receives an input operation from the user (Step S270). The session management 142 acquires target user information from the data management 162 (Step S272) and compares the user information with the authentication information (Step S274). When the session management 142 determines that the user is authentic, the UI 120 returns to the screen context (Step S276).

In the configuration according to the first embodiment, the session management 142 and the request management 144 of the control 140 cooperate with each other to perform the user authentication before accepting an interruption or after the interruption by displaying the lock screen. This makes it possible to prevent a third party from pretending to be the authentic user. If it is determined from the IC card or the like that the user is identical, the password check is omitted from the user authentication or the lock screen is skipped. This allows the user to save the workload for the authentication thereby making it possible to obtain a good balance between the usability and the security.

As for the authentication technology for identifying the user, it is possible to employ biometrics using, for example, a finger print, a retina, or a vein in addition to the noncontact IC card or the contact-type IC card. It is also possible to combine biometrics with the IC card, the password, or a universal serial bus (USB) authentication key or a radio-frequency identification (RFID) tag. It is allowable to use a lightweight directory access protocol (LDAP) server or an active directory server for the authentication instead of the local database.

The system denies a request of an interruption when the user is not authentic. Moreover, the system can deny a request of an interruption depending on information about ranking among users. The information about ranking among users is used to compare an interrupted user with an interrupting user in, for example, the authority or the job level. The system can determine whether a request of an interruption is to be processed depending on the information about ranking among users.

FIG. 12 is a block diagram for explaining a hardware configuration of the MFP 10. The MFP 10 includes a scanner 50, a plotter 52, a device control unit 54 that controls the scanner 50 and the plotter 52, a network control unit 56 that perform communications by connecting to a network, a read only memory (ROM) 58 that stores therein various programs, a central processing unit (CPU) 60 that controls each unit of the MFP 10 according to the programs in the ROM 58, a random access memory (RAM) 62 and a static random access memory (SRAM) 64 that stores various data required to control the MFP 10, an image-data memory 66 that stores image data read by the scanner 50, an operation panel 68, and an operation control unit 70 that controls the operation panel 68.

The layer structural functions of the MFP 10 as shown in FIG. 1 are implemented as the CPU 60 executes the program in the ROM 58.

Figure 13:
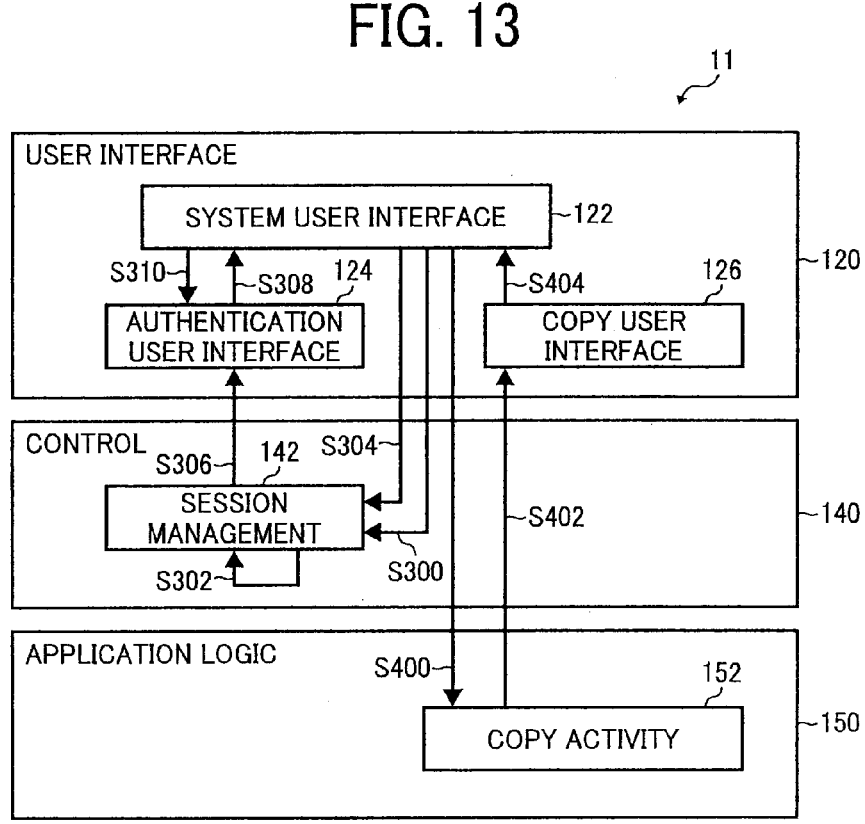
FIG. 13 is a functional block diagram of an MFP according to a second embodiment of the present invention.
Figure 14:
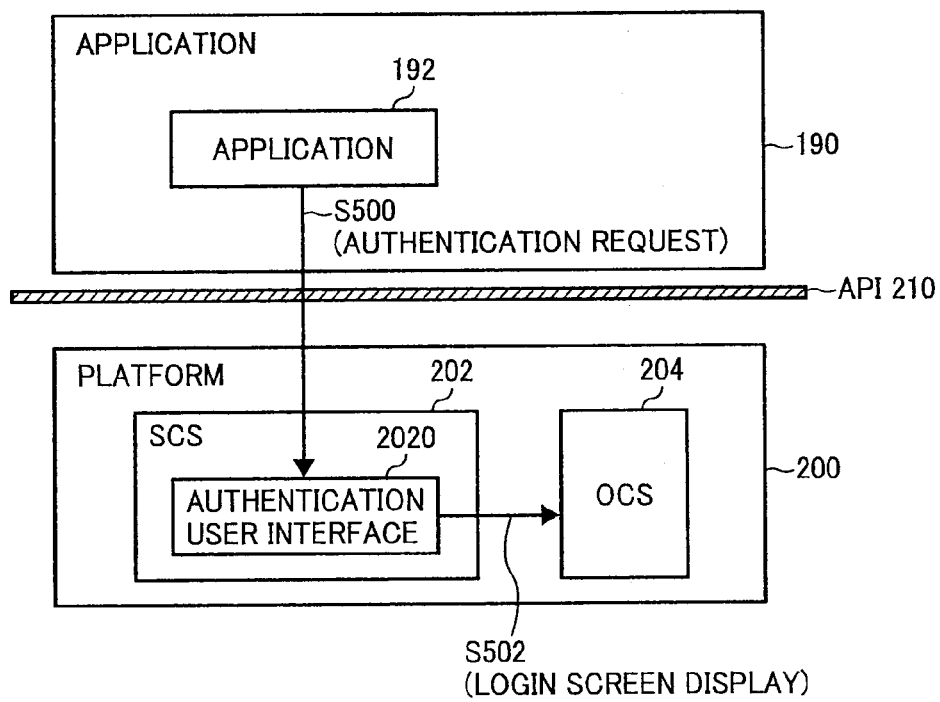
FIG. 14 is a functional block diagram of a conventional MFP.

FIG. 13 is a functional block diagram of an MFP 11 according to a second embodiment of the present invention. FIG. 14 is a functional block diagram of a conventional MFP. Salient features of the MFP 11 are described by comparing to the conventional MFP.

The MFP 11 includes, from an upper layer to a lower layer, the UI 120 that receives a request from a subscriber, the control 140 that receives an execution of the request from the UI 120, and the application logic 150 that provides a target function under the execution of the request by the control 140. The UI 120 includes a system UI 122 working as a base, an authentication UI 124 that creates the login screen, and a copy UI 126 that creates the copy screen. The control 140 includes the session management 142 that associates a user with an activity thereof (a series of processes executed by the system) during a period from login to logout of the user (i.e., during the session) and performs the user authentication to identifies a user who requests an operation. The application logic 150 includes a copy activity 152 that performs a series of processes about copy.

The conventional MFP shown in FIG. 14 includes, from an upper layer to a lower layer, an application 190 including an application 192 that is made from a group of software pieces, an application program interface (API) 210 that allows a process request from the application 190 to receivable using predetermined functions, and a platform 200 that interprets the process request from the application 190 and occurs a request for acquiring a hardware resource. The platform 200 includes a system control service (SCS) 202 that performs application control, operation-unit control, system-screen display, LED display, resource management, and interruption-application management and an operation-panel control service (OCS) 204 that perform control over the operation panel working as a communications unit. The SCS 202 includes an authentication UI 2020 that creates the login screen.

In the conventional MFP, the application 192 invokes the API 210 and requests the authentication UI 2020 to perform the authentication via the API 210 (Step S500). When the authentication succeeds, the authentication UI 2020 causes the OCS 204 to display the login screen (Step S502). It means that the SCS 202 working as a module is invoked by the application such as the copy application and the facsimile application so that the authentication UI is displayed on the operation screen for the authentication. A result of the authentication is returned to the application 192. In the configuration described above, if the application 192 has no program containing a code to invoke the SCS 202 (i.e., code to request for an authentication), the application 192 cannot invoke the SCS 202. Therefore, it is possible to perform an application process without performing authentication. To add an application later, for example, it is necessary to prepare the code to request for an authentication to be written to each application.

In the MFP 11 in contrast, the system UI 122 is placed upper layer than any of the applications so that the system UI 122 can perform a process prior to any application does. The system UI 122 requests the session management 142 to perform an authentication (Step S300 equivalent to Step S200 in FIG. 9). The session management 142 creates a session (Step S302 equivalent to Step S202 in FIG. 9). The system UI 122 logins (Step S304 equivalent to Step S208 in FIG. 9). The session management 142 sends to the authentication UI 124 a request for the authentication information (Step S306 equivalent to Step S210 in FIG. 9). The authentication UI 124 then creates the login screen, and displays the login screen (Step S308 equivalent to Step S212 in FIG. 9). The system UI 122 receives authentication information from the user through the login screen and performs the authentication using the authentication information (Step S310 equivalent to Step S214 in FIG. 9). The authentication information is returned to the session management 142 (opposite to the direction in Step S306, i.e., equivalent to Step S210 in FIG. 9). Upon receiving the authentication information, the session management 142 performs the authentication process (Step S216 and subsequent steps in FIG. 9).

When the authentication succeeds, the system UI 122 activates the copy activity 152 (Step S400). The copy activity 152 causes the copy UI 126 (Step S402) to display the application UI (Step S404). Steps S400 to S404 are equivalent to Step S226 in FIG. 10. As a result, the application is configured capable of performing the authentication, even if the authentication UI is not installed in the application. The application does not obtain an execution authority until the authentication succeeds. The application itself is free from the authentication, and therefore the login authentication is performed even if the code to request for an authentication is not installed in each application. This allows obtaining a higher security. Moreover, the configuration in which it is unnecessary for the application to be installed with the authentication code facilitates plug-in development thereby facilitating customizing of the MFP.

In the second embodiment modules of the control 140 and the UI 120 are placed upper than the application logic 150. Therefore, it is possible to realize a sequence of processes in which the authentication process is performed first and, when the authentication succeeds, the execution by the application follows. This allows obtaining a higher security. Moreover, the configuration in which it is unnecessary for the application to be installed with the authentication code facilitates plug-in development thereby facilitating customizing of the MFP.

There are two cases when an identical user performs a series of interruptions. The first case is that, after a first interruption has finished and the user logouts, a second interruption process occurs by an identical user (hereinafter, "sequential interruption by the identical user"). The second case is that the second interruption process by the identical user occurs before the first interruption has finished (hereinafter, "multiple interruption by the identical user"). It is possible to skip the user authentication in those two cases because the identical user performs a series of interruptions. The following third case, though not fallen into the serious interruption by the identical user, can also omit the password check. The third case is that during executing of a first job of a first user a second user interrupts the first job and executes a second job, and after that the first user interrupts the second job to execute a third job (hereinafter, "multiple interruption by the interrupted user"). A third embodiment of the present invention describes various types of interruptions.

Figure 15A:
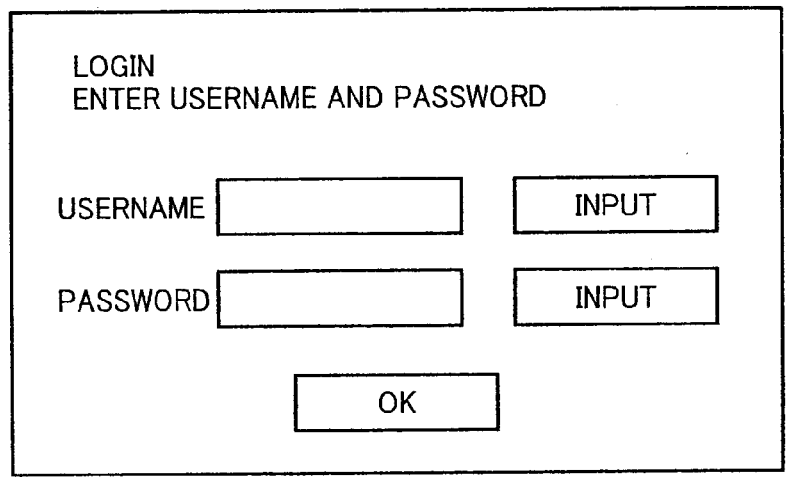
FIGS. 15A and 15B are schematic diagrams for explaining how the screen changes between the operation screen and the login screen.
Figure 15B:
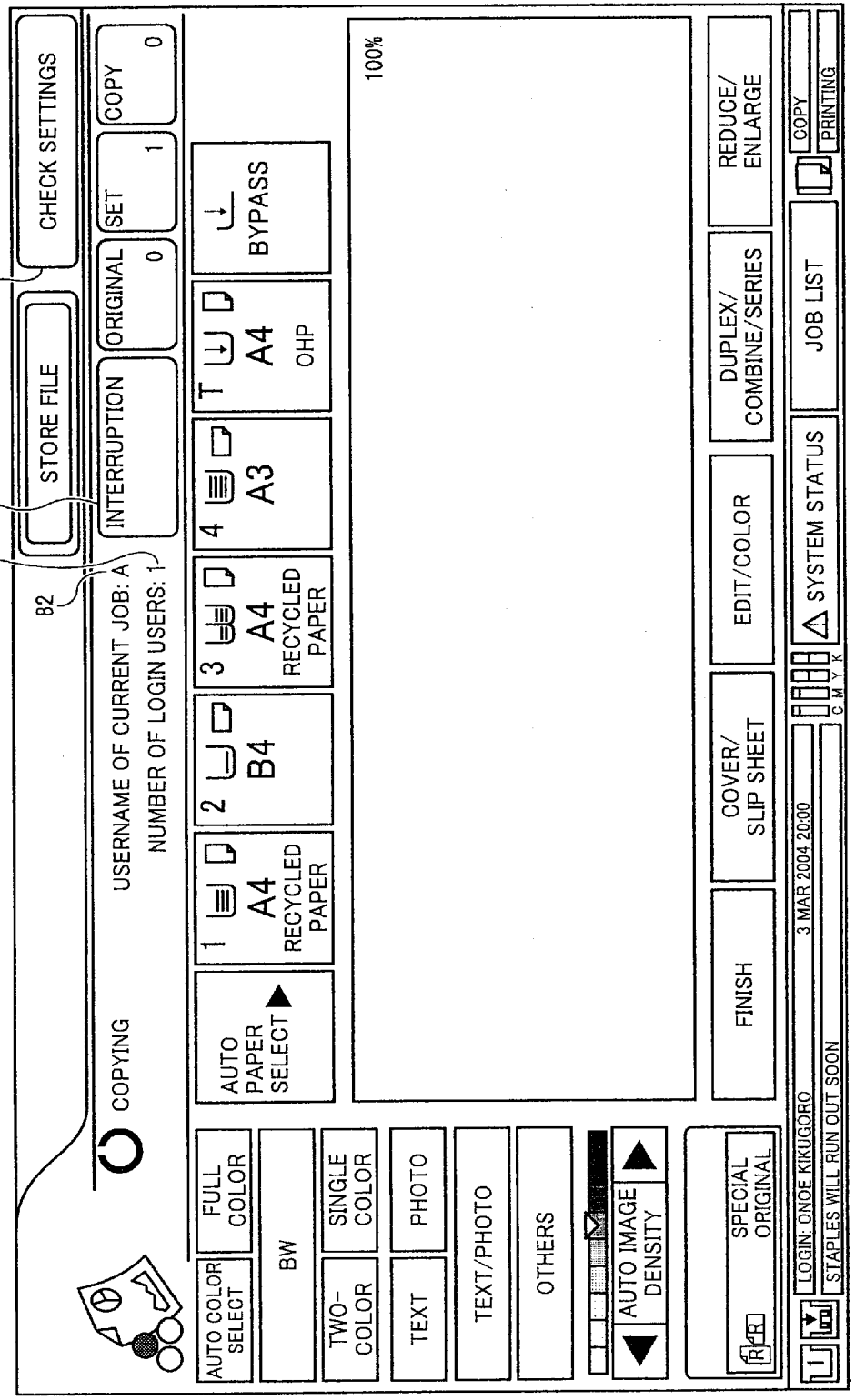

FIGS. 15A and 15B are schematic diagrams for explaining how the screen changes between the operation screen and the login screen. An operation screen 80 shown in FIG. 15B appears when the authentication succeeds; and a login screen 31 shown in FIG. 15A appears when a certain condition is satisfied while the operation screen 80 appears. The login screen 31 prompts a user who requests an operation to enter authentication information that is used to identify the user. When an authentication succeeds, the system causes the user to login and displays the operation screen 80. Thus, the user can operate the MFP 10.

When a predetermined time has pasted since the last operation while the job is in action and the operation screen 80 appears, the system locks the screen, logouts, and displays the login screen 31. When a predetermined time has pasted since the last operation while no job is in action, a logout process is performed automatically. When the lock key 42 is pressed while the operation screen 80 appears, the login screen 31 appears. When the login/logout key 41 is pressed, a logout process is performed and the login screen 31 appears. Thus, the lock screen can be used as the login screen.

The interruption process means a process of interrupting a first job in action and executing a second job prior to the interrupted first job. A first user of the first job can be either identical or non-identical to a second user of the second job. In a multiple interruption, that is, a case that a third user interrupts the second job to execute a third job prior to the second job, the second user can be either identical or non-identical to the third user.

It is possible to make indicators appear on the operation screen 80 such as a current-username indicator 82 that indicates current username who operates the operation unit (e.g., username A), a number-of-login user indicator 84 (e.g., 1), and an interruption indicator 86 that appears during the interruption process.

If during executing of a first job of a first user a second user tries to interrupt the first job to execute a second job where the first user and the second user are not identical, the second user presses the interruption key 37 to make the login screen 31 appear. The second user then enters the authentication information. When the authentication succeeds, the operation screen 80 appears allowing the second user to perform an interruption process.

The sequential interruption by the identical user occurs when the identical user logouts at the end of a first interruption process and logins again within a predetermined period after the logout, and after that performs a second interruption process. In the sequential interruption by the identical user, it is assumed that the user of the second interruption is authentic, i.e., it is impossible for a non-authorized third party to pretend to be the authentic user. Therefore, it is possible to skip the password check to reduce a workload for the authentication process. The predetermined period is short enough to assume that after the end of the first interruption the second interruption is issued not by an un-authorized third party but by the identical user because the identical user continues operating the image forming apparatus. Although the predetermined period is set to several minutes (e.g., five minutes) in the third embodiment, the predetermined period can vary depending on the installation position or the circumstances of the image forming apparatus. If the user starts a next job after the end of the first interruption job maintaining the login state without performing logout, the next job is executed using the same interruption session.

The multiple interruption by the identical user occurs when a second interruption process by an identical user occurs during a first interruption process being in action. When a user tries to perform the multiple interruption by the identical user, the user presses the interruption key 37. Because the login screen 31 does not appear, the user can immediately perform a next interruption process. The user authentication can be skipped to reduce the workload for the authentication process in the multiple interruption by the identical user because the identical user performs the interruption processes. It is allowable to cause the login screen 31 to appear when the interruption key 37 is pressed. After that, if the newly-entered username is identical to the user of the job in action, the process control can skip the password check.

The multiple interruption by the interrupted user occurs when during executing of a first job of a first user a second user interrupts the first job and executes a second job and then the first user interrupts the second job to execute a third job. The password check in the multiple interruption by the interrupted user, though the interruption is issued not by the identical user but by the interrupted user, can be saved similarly to that in the sequential interruption by the identical user and the multiple interruption by the identical user. If the password check is omitted, a workload for the authentication process is reduced.

Figure 16:
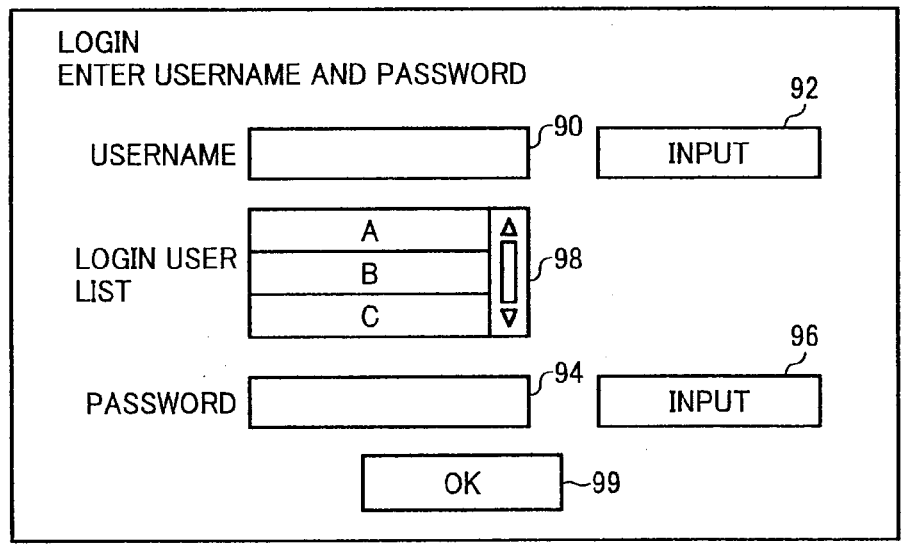
FIG. 16 is a schematic diagram of another example of the login screen with a login-user list.

FIG. 16 is a schematic diagram of another example of the login screen 31 with a login-user list 98. The login screen 31 shown in FIG. 16 is obtained by adding the login-user list 98 to the login screen 31 shown in FIG. 15. The system has grasped the login state of users by using the login screen. Therefore, it is possible to add the login-user list 98 to the login screen.

With the login screen 31 shown in FIG. 16, a login user who requests an interruption can fill the username by selecting his/her username (user A, B, or C) from the login-user list 98 instead of by filling the username in a username box 90 with a software keyboard that is displayed when an input button 92 is pressed. If the login user is the identical user or the interrupted user in the sequence interruption by the identical user, the multiple interruption by the identical user, or the multiple interruption by the interrupted user, the login user can save the workload of filling a password box 94 with a software keyboard that is displayed when an input button 96 is pressed. That is, the login user can cause the authentication process to start just by selecting his/her username from the login-user list 98 and then pressing an OK button 99.

Figure 17:
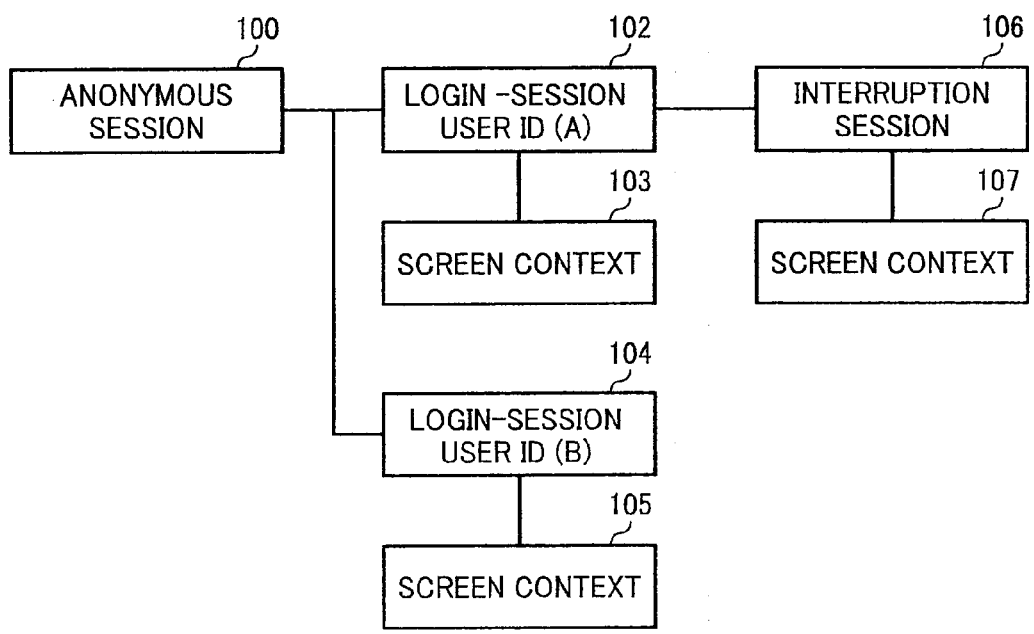
FIG. 17 is a block diagram for explaining the data formation of a session used in an image forming apparatus according to a third embodiment of the present invention.

FIG. 17 is a block diagram for explaining the data formation of a session used in an image forming apparatus according to the third embodiment. The session includes an anonymous session 100, a login session 102, a screen context 103, a login session 104, a screen context 105, an interruption session 106 that is issued by an identical user who issues the login session 102, and a screen context 107.

The anonymous session 100 is created at a system startup. The login session 102 by a user-ID (A) is created at a login. The login session 104 by a user-ID (B) is created at an interruption for interrupting the login session 102. The interruption session 106 is created when the identical user-ID (A) interrupts the login session 102.

Figure 18:
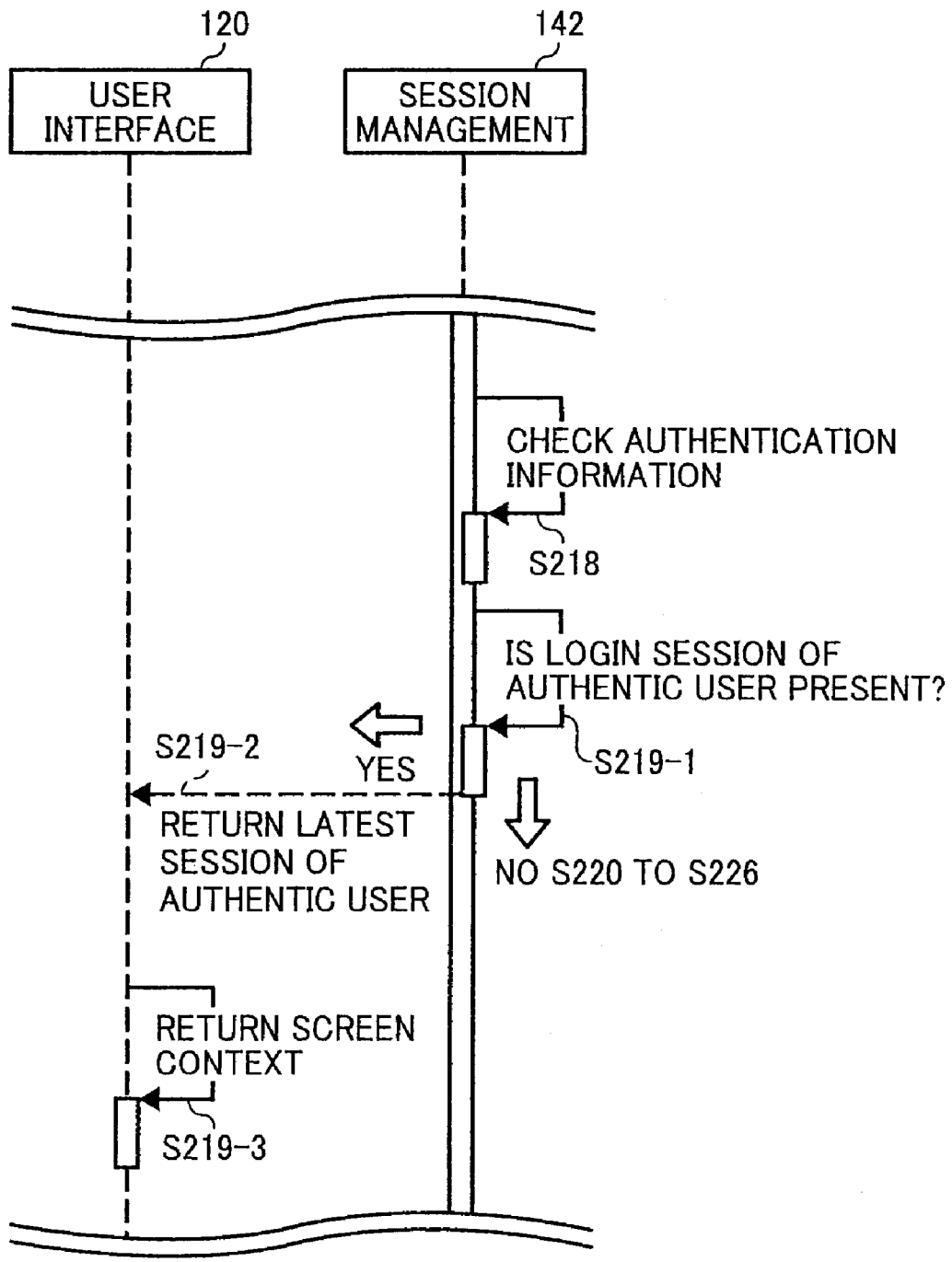
FIG. 18 is a sequence diagram in which different operation screen appears depending on whether a login session of an authentic user is present.

FIG. 18 is a sequence diagram in which different operation screen appears depending on whether a login session of the authentic user is present. When the session management 142 determines whether a login session of the authentic user is present (Step S219-1) and then determines that a login session of the authentic user is present (Yes at Step S219-1), the session management 142 returns a latest session of the authentic user to the UI 120 (Step S219-2). In a case of the data formation shown in FIG. 17, if the user ID of the authentic user is the user-ID (A), the latest session corresponds to the interruption session 106. If the user ID of the authentic user is the user-ID (B), the latest session corresponds to the login session 104. When the interruption is released or a login user logs in again (i.e., when the lock screen in the first embodiment is released), the screen is re-built based on context information obtained from the screen context 103, 105, or 107.

The session information is sent from the session management 142 to the request management 144 in response to a request of a job or a request of an interruption. Therefore, it is possible to perform an access control or a charge control based on the session information (user ID) related to an execution of the application.

Figure 19:
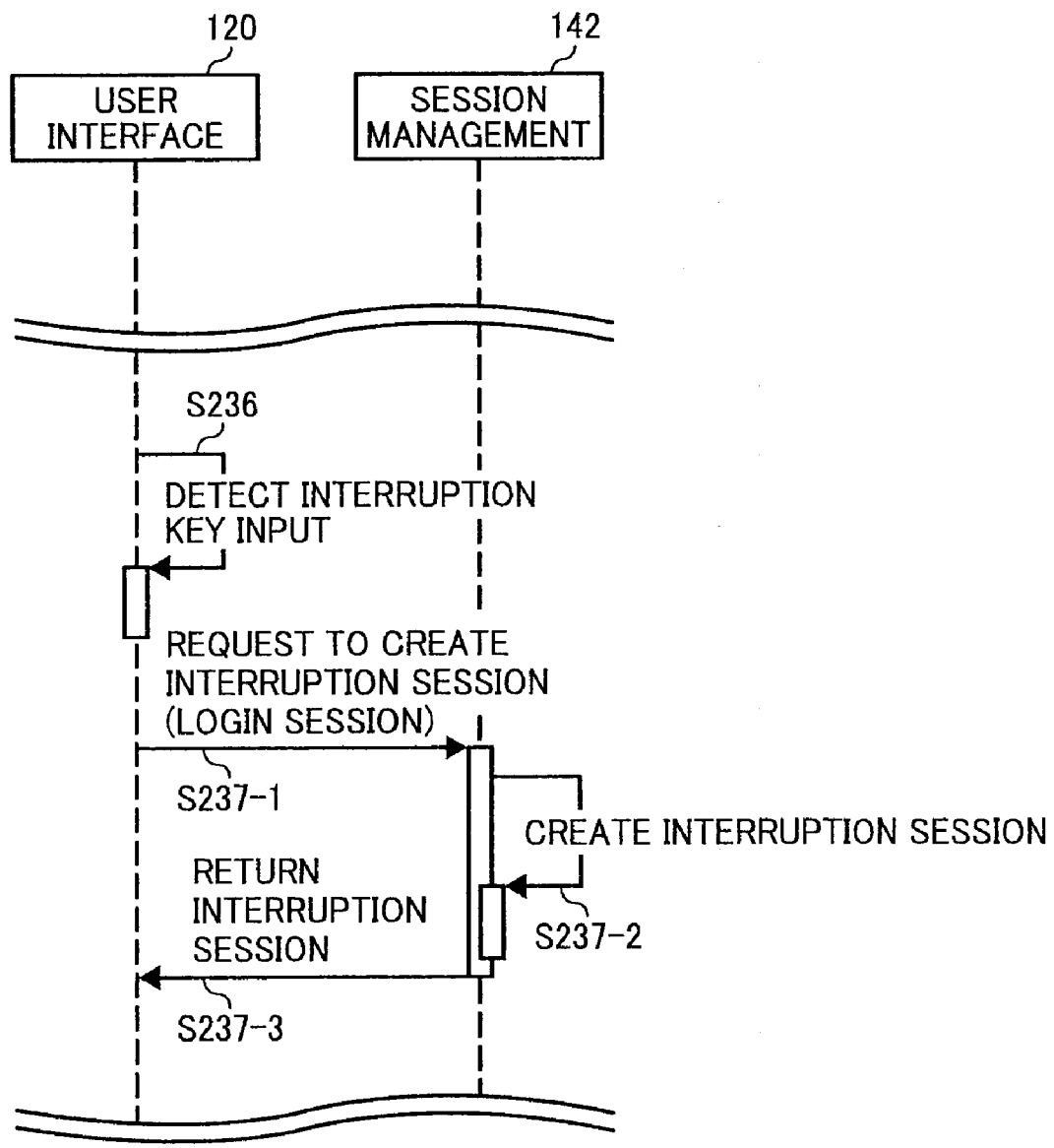
FIG. 19 is a sequence diagram for explaining a process in which an identical user interrupts a job in action that is issued by the identical user and executes a new job.

FIG. 19 is a sequence diagram for explaining a process in which an identical user interrupts a job in action that is issued by the identical user and executes a new job (hereinafter, "interruption by the identical user"). The interruption by the identical user occurs when after a user executes a first job, the user presses the interruption key 37 and interrupts the first job in action to execute a second job as in a similar manner to Step S263 show in FIG. 10. This situation will happen, for example, the user wants to execute one-page copy job while the mass copy job by the identical user is in action. When the UI 120 detects the interruption key 37 presses (Step S236), the UI 120 requests the session management 142 to create an interruption session (Step S237-1). The session management 142 then creates the interruption session 106 (Step S237-2) and returns the interruption session 106 to the UI 120 (Step S273-3).

As described above, it is allowable to interrupt a job in action by the identical user. If the interruption by the identical user happens, the interruption session 106 is created. Because the interruption by the identical user and the sequence interruption by the identical user are similar, the user authentication can be skipped. Moreover, because the interrupted job is issued by the identical user, it is possible to return to the interrupted job without authentication, i.e., without the login screen that is to be displayed after the end of the interruption.

Figure 20:
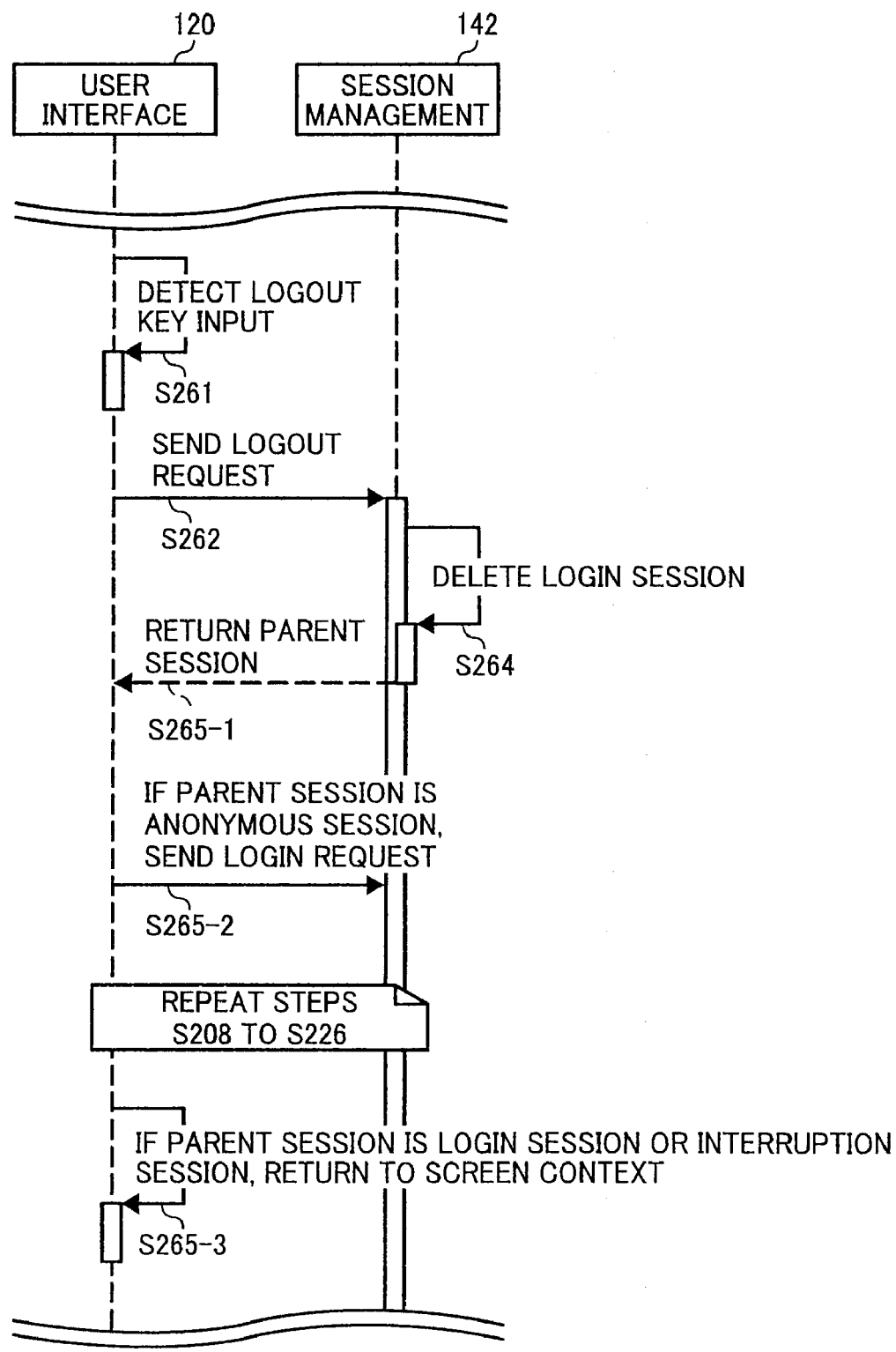
FIG. 20 is a sequence diagram for explaining a logout process after a multiple interruption.

FIG. 20 is a sequence diagram for explaining a logout process after the multiple interruption. Upon detecting the login/logout key 41 presses (Step S261), the UI 120 sends a logout request to the session management 142 (Step S262). Upon receiving the logout request, the session management 142 deletes the login session (Step S264) and returns to the UI 120 a parent session of the deleted session (Step S265-1). A parent session and a child session are used in a relative concept. For example, if the login session 102 is created from the anonymous session 100 that is created at the system startup, then the anonymous session 100 is a parent session and the login session 102 is a child session. If the interruption session 106 is created from the login session 102 due to a first interruption that interrupts the login session 102, then the login session 102 is a parent session and the interruption session 106 is a child session. Thus, when the interruption session 106 ends and the interruption session 106 is deleted (Step S264), the login session 102 that is the parent session of the interruption session 106 is returned (Step S265-1). If the login session 102 has already ended, the anonymous session 100 that is the parent session of the login session 102 is returned. If the anonymous session is returned, the UI 120 sends, in a similar manner at the system startup, a login request to the session management 142 (Step S265-2), and then Steps S208 to S226 are repeated.

If the returned parent session is a login session by itself or an interruption session, the authentication process for returning to the session by itself can be skipped. The UI 120 returns the screen context (Step S265-3) thereby re-building the screen that is used to be displayed before the interruption starts based on the context information.

As described above, in the logout process after the multiple interruption or the like, it is unnecessary to perform the authentication process to return to the session by itself. Skipping the lock screen to be displayed after the end of the interruption allows the identical user to save entering the username and the password several times.

According to an aspect of the present invention, although the interruption UI and the authentication UI are not installed in each of the applications, any of the applications can perform the common interruption process and the common authentication process.

Moreover, according to another aspect of the present invention, the application cannot be activated until the authentication succeeds, which can exclude access controls by non-authentic users.

Furthermore, according to still another aspect of the present invention, it is impossible for a non-authentic third party to interrupt a job in action issued by an authentic user to execute a new job, pretending to be the authentic user even while the authentic user is absent. This will bring a large effect in job-based charging.

Moreover, according to still another aspect of the present invention, it is possible to determine whether an interruption is to be processed based on ranking among users in addition to authenticity of the user. The ranking among users can be determined based on, for example, authorities or job levels of users.

Furthermore, according to still another aspect of the present invention, assuming that a case happens in which during a first job of a first user being in action a second user interrupts the first job and executes a second job, and thereafter a third user tries to execute a third job. If the third user is a non-authentic third party and tries to pretend to be the authentic first user, it is impossible for the third user to execute the third job. On the other hand, the authentic third user can resume the third job.

Moreover, according to still another aspect of the present invention, it is possible to save the user to enter the password again.

Furthermore, according to still another aspect of the present invention, it is possible to display a suitable operation screen depending on whether the session information is present, and thereby the user can operates the image forming apparatus with the suitable operation screen.

Moreover, according to still another aspect of the present invention, even in the multiple interruption happens, it is possible to return to the session in action by processing a series of sessions in the descending order from the latest session.

Furthermore, according to still another aspect of the present invention, it is possible to display an operation screen used to be displayed while an interrupted job is in action.

Moreover, according to still another aspect of the present invention, the user can easily understand whether the image forming apparatus is in the interruption mode by just looking at the operation screen.

Furthermore, according to still another aspect of the present invention, it is possible to select the lock screen to a display mode or a hide mode. When the hide mode is selected, the user is allowed to save entering the password. When the display mode is selected, the security of the image forming apparatus strengthens. It is possible to change the mode to be selected depending on situations.

Moreover, according to still another aspect of the present invention, it is possible to decide the display/hide mode of the lock screen depending on each interruption at the start or the end of the interruption.

Furthermore, according to still another aspect of the present invention, it is unnecessary for the user to type typing the username.

Moreover, according to still another aspect of the present invention, it is possible to prevent an occurrence of the unlocked screen due to carelessness.

Furthermore, according to still another aspect of the present invention, it is possible to create a program for the interruption process and the authentication program commonly used from any application, even when the program is not installed in the application.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus configured to perform a plurality of functions related to an image forming process, the image forming apparatus comprising:
    a user-interface unit configured to receive a request from a user;
    a control unit configured to control an execution process in response to the request received by the user-interface unit, wherein during the execution process, the control unit is configured to process an interruption process and a related authentication process;
    an application-logic unit configured to perform, based on the execution process of the control unit, at least one of the functions related to the image forming process; and
    a device-service unit configured to provide a shared service for the application-logic unit.

2. The image forming apparatus according to claim 1, wherein the control unit includes
    a session management unit configured to perform, during a session from a login to a logout of the user, the authentication process, and to perform a user authentication by associating a user and a session identified at the authentication process; and
    a request management unit configured to perform, when a session provided by the session management unit is valid, an execution control of the request from the user.

3. The image forming apparatus according to claim 2, wherein the session management unit is configured to request the authentication process when performing an interruption.

4. The image forming apparatus according to claim 3, wherein the session management unit is configured to determine whether to perform the interruption based on information indicating a user level.

5. The image forming apparatus according to claim 2, wherein the session management unit is configured to display a lock screen at an end of an interruption, to request a user authentication, and to return to an operation screen when the authentication process succeeds.

6. The image forming apparatus according to claim 3, wherein the session management unit is configured to pass a password check in the authentication process, when the user-interface unit receives an interruption request from a login user.

7. The image forming apparatus according to claim 2, wherein
    the session management unit is configured to display an authentication screen at an end of an interruption, when there is a session of a login user, to display an operation screen corresponding to the session, when there is no session of the login user, to determine that an interruption occurs, and then to create a new session and display an operation screen corresponding to the new session.

8. The image forming apparatus according to claim 7, wherein the session management unit is configured to pass the authentication process, when there is the session of the login user and a job is being executed in a returned session, and when there is an interruption by the user.

9. The image forming apparatus according to claim 7, wherein the session management unit displays is configured to display an operation screen corresponding to a latest session when there is a plurality of sessions of the login user.

10. The image forming apparatus according to claim 7, wherein the session management unit is configured to display an operation screen of a latest session without performing the authentication process, after a current user ends an interruption, if at least one session of the user is left.

11. The image forming apparatus according to claim 7, wherein the session management unit is configured to display the operation screen on which a username of a current user, a number of login users, and an icon indicating that an interruption process is running, while suspending other jobs.

12. The image forming apparatus according to claim 3, wherein the session management unit is configured to pass a password check in the authentication process since a second time interruption request, when there are a series of interruption requests from an identical user.

13. The image forming apparatus according to claim 12, wherein the session management unit is configured to pass a password check in the authentication process, when there is a second interruption request from an identical user within a predetermined time after a first interruption process is finished.

14. The image forming apparatus according to claim 5, wherein the session management unit is configured to skip a lock-screen display at an end of an interruption since a second time of interruption request, when there is a second interruption request from an identical user.

15. The image forming apparatus according to claim 5, wherein the session management unit is configured to allow a setting of displaying the lock screen at the end of the interruption.

16. The image forming apparatus according to claim 15, wherein the session management unit is configured to allow the setting of displaying the lock screen by a lock key on each interruption job.

17. The image forming apparatus according to claim 1, wherein the authentication process includes a combination of a presentation of a noncontact integrated-circuit card and an input of a password.

18. The image forming apparatus according to claim 2, wherein
the authentication process includes a combination of a presentation of a contact-type integrated-circuit card and an input of a password, and
the session management unit is configured to display a lock screen when the contact-type integrated circuit is removed.

19. A method of managing an interruption in an image forming apparatus having a plurality of functions related to an image forming process, the method comprising:
receiving, by a user-interface unit, a request from a user;
controlling, by a control unit, an execution process in response to the request received in the receiving step, and during the execution process, performing an interruption process and a related authentication process;
performing, by an application-logic unit, based on the execution process of the control unit, at least one of the functions related to the image forming process; and
providing a shared service for the application-logic unit.

20. A non-transitory computer-readable medium having computer-readable program codes embodied in the medium that, when executed, cause a computer to execute:
receiving, by a user-interface unit, a request from a user;
controlling, by a control unit, an execution process in response to the request received in the receiving step, and during the execution process, performing an interruption process and a related authentication process;
performing, by an application-logic unit, based on the execution of the control unit, at least one of the functions related to the image forming process; and
providing a shared service for the application-logic unit.

* * * * *